US012776976B2

(12) United States Patent
Wang et al.

(10) Patent No.: US 12,776,976 B2
(45) Date of Patent: Oct. 27, 2026

(54) NODE IN WIRELESS COMMUNICATION SYSTEM AND METHOD PERFORMED BY THEREOF

(71) Applicant: Samsung Electronics Co., Ltd., Suwon-si (KR)

(72) Inventors: Yanru Wang, Beijing (CN); Hong Wang, Beijing (CN); Lixiang Xu, Beijing (CN); Weiwei Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 303 days.

(21) Appl. No.: 18/580,895

(22) PCT Filed: Jul. 21, 2022

(86) PCT No.: PCT/KR2022/010703
§ 371 (c)(1),
(2) Date: Jan. 19, 2024

(87) PCT Pub. No.: WO2023/003392
PCT Pub. Date: Jan. 26, 2023

(65) Prior Publication Data

US 2025/0088445 A1 Mar. 13, 2025

(30) Foreign Application Priority Data

Jul. 21, 2021 (CN) ........................ 202110827225.4
Aug. 18, 2021 (CN) ........................ 202110949145.6

(51) Int. Cl.
*H04L 43/0852* (2022.01)
*H04L 43/062* (2022.01)

(52) U.S. Cl.
CPC ........ *H04L 43/0852* (2013.01); *H04L 43/062* (2013.01)

(58) Field of Classification Search
CPC .......................... H04L 43/0852; H04L 43/062
(Continued)

(56) References Cited

U.S. PATENT DOCUMENTS

2020/0359244 A1* 11/2020 Yao ...................... H04W 24/10

FOREIGN PATENT DOCUMENTS

EP 3826354 A1 5/2021

OTHER PUBLICATIONS

Nokia et al., 'Need for L2 Measurements enhancements', R2-2009435, 3GPP TSG-RAN WG2 Meeting #112 Electronic, Elbonia, Oct. 22, 2020.

(Continued)

*Primary Examiner* — Chi Tang P Cheng
(74) *Attorney, Agent, or Firm* — Jefferson IP Law, LLP

(57) ABSTRACT

The present disclosure relates to a 5G communication system or a 6G communication system for supporting higher data rates beyond a 4G communication system such as long term evolution (LTE). The present disclosure provides a first node in a wireless communication system and an method performed by the same, including: receiving first information from a second node in the wireless communication system: and determining an interface delay of a General Packet Radio Service Tunneling Protocol User Plane (GTP-U) packet between a GTP-U packet transmission node and a GTP-U packet reception node based on the first information.

18 Claims, 12 Drawing Sheets

(58) Field of Classification Search
USPC .......................................................... 370/241
See application file for complete search history.

(56) References Cited

OTHER PUBLICATIONS

Zte, ‘CR for TS38.425 on enhancements for more efficient PDCP duplication’, R3-196649, 3GPP TSGRAN WG3 #106, Reno, NV, USA, Nov. 8, 2019.

‘3GPP; TSG SA; Management and orchestration; 5G performance measurements (Release 17)’, 3GPP TS 28.552 V17.3.1, Jun. 24, 2021.

‘3GPP; TSG RAN; NR; Layer 2 Measurements; (Release 16)’, 3GPP TS 38.314 V16.3.0, Mar. 29, 2021.

International Search Report and written opinion Oct. 28, 2022. issued in International Application No. PCT/KR2022/010703.

* cited by examiner

NODE IN WIRELESS COMMUNICATION SYSTEM AND METHOD PERFORMED BY THEREOF

TECHNICAL FIELD

The present disclosure is related generally to the field of wireless communication, and more particularly, to nodes in a wireless communication system and methods performed by thereof.

BACKGROUND ART

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

DISCLOSURE OF INVENTION

Solution to Problem

According to an aspect of the present disclosure, there is provided a method performed by a first node in a wireless communication system, including receiving first information from a second node in the wireless communication system; and determining an interface delay of a General Packet Radio Service Tunneling Protocol User Plane (GTP-U) packet between a GTP-U packet transmission node and a GTP-U packet reception node based on the first information.

According to another aspect of the present disclosure, there is provided a method performed by a second node in a wireless communication system, including: transmitting first information to a first node; and wherein, the first information is used by the first node to determine an interface delay of a General Packet Radio Service Tunneling Protocol User Plane GTP-U packet between a GTP-U packet transmission node and a GTP-U packet reception node.

According to yet another aspect of the present disclosure, there is provided a node in a wireless communication network, including a transceiver configured to transmit and receive signals; and a controller configured to control the transceiver to perform various methods provided by the present disclosure.

BRIEF DESCRIPTION OF DRAWINGS

The above and other aspects, features and advantages of certain embodiments of the present disclosure will become more apparent from the following description taken in conjunction with the accompanying drawings, in which.

MODE FOR THE INVENTION

Figure 1:
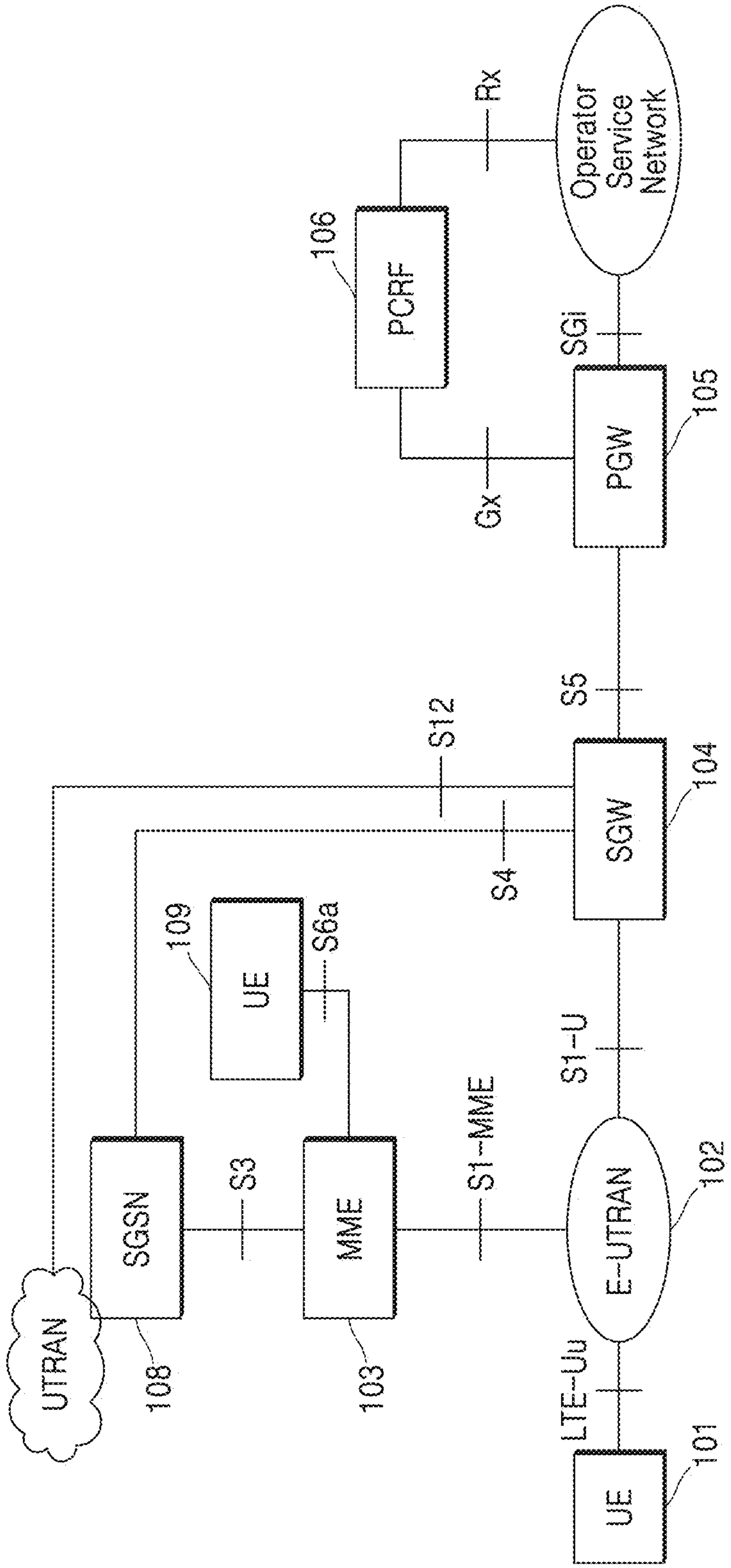
FIG. 1 illustrates an exemplary system architecture of system architecture evolution (SAE) according to an embodiment of the present disclosure.

Other technical features may be readily apparent to one skilled in the art from the following figures, descriptions, and claims.

Before undertaking the detailed description below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

According to an embodiment of the disclosure, a server configured to manage traffic prediction model transfer learning among cellular communications base stations (including as a non-limiting example, 5G base stations) is provided. The server includes: one or more processors; and one or more memories, the one or more memories storing a program, wherein execution of the program by the one or more processors is configured to cause the server to at least: receive a first plurality of base station statistics, wherein the first plurality of base station statistics includes a first data set of a first size from a first base station; receive a second plurality of base station statistics, wherein the second plurality of base station statistics includes a second data set of a second size corresponding to a second base station; select the first base station as a source base station; train a similarity network; receive a source prediction model from the first base station and a first importance score matrix; receive a prediction model request from a target base station, wherein the target base station is the second base station; compute a first similarity using the similarity network; obtain a first scaled importance score matrix based on an importance score matrix and based on the first similarity; and send the source prediction model and the first scaled importance score matrix to the second base station. Thus, the second base station is configured to use the source prediction model, and the first scaled importance score matrix to generate a target prediction model and predict radio system parameters relevant to the second base station. The radio system parameters include a future value of user data traffic passing through the second base station.

FIGS. 1 to 11 discussed below and various embodiments used to describe the principles of the present disclosure in this patent document are for illustration only, and should not be interpreted as limiting the scope of the present disclosure in any way. Those skilled in the art will understand that the principles of the present disclosure can be implemented in any appropriately arranged system or device.

FIG. 1 is an exemplary system architecture 100 of System Architecture Evolution (SAE) according to an embodiment of the present disclosure. A user equipment (UE) 101 is a terminal equipment for receiving data. An evolved universal terrestrial radio access network (E-UTRAN) 102 is a radio access network, which includes a macro base station (eNodeB/NodeB) that provides access to the radio network interface for UE. The mobility management entity (MME) 103 is responsible for managing the mobility context, session context and security information of the UE. The serving gateway (SGW) 104 mainly provides the function of the user plane, and the MME 103 and SGW 104 may be in the same physical entity. Packet data network gateway (PGW) 105 is responsible for accounting, lawful interception and other functions, and may also be in the same physical entity as SGW 104. Policy and charging rule function entity (PCRF) 106 provides quality of service (QOS) policies and charging criteria. The serving general packet radio service support node (SGSN) 108 is a network node device in universal mobile telecommunications system (UMTS) that provides routing for data transmission. Home subscriber server (HSS) 109 is the home subsystem of UE, which is responsible for protecting user information including current location of user equipment, address of serving nodes, user security information, packet data context of user equipment, etc.

Figure 2:
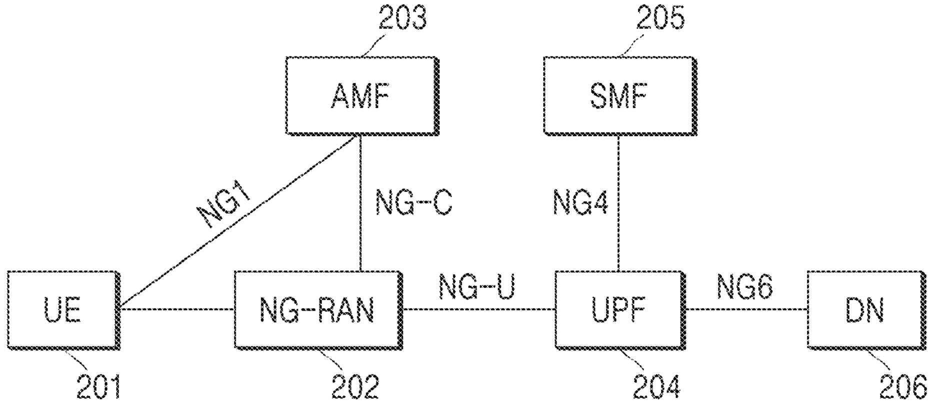
FIG. 2 illustrates an exemplary system architecture according to an embodiment of the present disclosure.

FIG. 2 is an exemplary system architecture 200 according to various embodiments of the present disclosure. Other embodiments of the system architecture 200 can be used without departing from the scope of the present disclosure.

A user equipment (UE) 201 is a terminal equipment for receiving data. The next generation radio access network (NG-RAN) 202 is a radio access network, which includes base stations (gNB or eNB connected to 5G core network (5GC), also called ng-gNB) that provide access to radio network interfaces for the UE. The access control and mobility management function entity (AMF) 203 is responsible for managing the mobility context and security information of the UE. The user plane function entity (UPF) 204 mainly provides the functions of the user plane. Session management function entity SMF 205 is responsible for session management. The data network (DN) 206 contains, e.g., services of operators, Internet access and services of third parties, etc.

The method for determining an interface delay between a General Packet Radio Service Tunneling Protocol User Plane (GTP-U) packet transmission node and a GTP-U packet reception node by two nodes (for example, a first node and a second node) will be described below with reference to FIGS. 3 to 11. For example, the first node may be a gNB central unit user plane (gNB-CU-UP) and the second node may be a gNB distributed unit (gNB-DU); the first node may be a gNB central unit control plane (gNB-CU-CP), and the second node may be a gNB-DU; the first node may be a user plane function (UPF), and the second node may be a next generation node B (gNB) or a gNB CU-UP or an en-gNB or an evolved node B (eNB) or a ng-eNB; the first node may be a gNB-CU-UP and the second node may be a gNB-CU-CP. However, the present disclosure is not limited to this, and the first node and the second node may be other nodes. With a gNB CU-UP and a gNB DU being examples of the first node and the second node, if the gNB CU-UP transmits a General Packet Radio Service Tunneling Protocol (GTP) packet to the gNB DU, the interface delay is a F1-U delay. The method for determining the F1-U delay may be, for example, a time when the gNB CU-UP receives transmission status information of a GTP packet from the gNB DU is subtracted by a time when the gNB CU-UP transmits the GTP packet, then subtracted by a feedback delay of the gNB DU, and the obtained delay is divided by 2 to obtain the F1-U delay. However, this is only an example, and the determination method of the F1-U delay is not limited to this.

In this disclosure, an en-gNB is a node that provides a NR user plane and a control plane with a terminal pointing to a UE, and acts as a secondary node in the evolved universal terrestrial radio access new radio dual connection (E-UTRA-NR Dual Connectivity, EN-DC); a ng-eNB is a node that provides an evolved universal terrestrial radio access (E-UTRA) user plane and a control plane with a terminal pointing to a UE, and is connected to a 5G core network through a NG interface.

This disclosure describes a method of supporting delay measurement through the following Examples 1 to 7. Each of Examples 1 to 7 can be implemented independently. Alternatively, a part of an example can be implemented separately. Or a part or all of one example can be combined with a part or all of (an) other example(s).

The determination in this disclosure can be acquisition, measurement, calculation, etc.

Example 1

A first node transmits a general packet radio service tunneling protocol user plane (GTP-U) packet to a second node, and after receiving the GTP-U packet, the second node transmits a first New Radio User Plane Protocol (NR-U) information frame or a first message containing parameters related to timestamps of the GTP-U packet at a GTP-U packet reception node (for example, the second node) to the first node, in order that the first node can determine a feedback delay of the GTP-U packet at the GTP-U packet reception node (for example, the second node), and then determine a transmission delay of the GTP-U packet on an interface (such as a F1-U). The first NR-U information frame may be assistance information data, DL data delivery status, or a newly defined information frame. The first message may be a message of F1 or NG or E1 or Xn or X2. The first NR-U information frame or the first message includes one or more of the followings:

A reception time point of the GTP-U packet: used to indicate the reception time point of the GTP-U packet at the GTP-U packet reception node (for example, the second node), which may be a relative time point or an absolute time point. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNs required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

A transmission time point of the NR-U information frame or the first message at the GTP-U packet reception node: used to indicate the transmission time point of the first NR-U information frame or the first message at the GTP-U packet reception node (for example, the second node). The transmission time point may be a relative time point or an absolute time point.

The first node receives the first NR-U information frame or the first message containing parameters related to the timestamps of the GTP-U packet at the GTP-U packet reception node (for example, the second node), and the first node can determine the interface delay as follows:

Method 1: the feedback delay of the GTP-U packet at the GTP-U packet reception node=a transmission time point of the NR-U information frame or the first message at the GTP-U packet reception node (for example, the second node)−the reception time point of the GTP-U packet.

Therefore, after the first node obtains the feedback delay of the GTP-U packet at the GTP-U packet reception node (for example, the second node) according to the above method, the first node can determine the interface delay according to the following method:

Method A: the interface delay=(the reception time point of the first NR-U information frame or the first message at the GTP-U packet transmission node (for example, the first node)−the transmission time point of the GTP-U packet−the feedback delay of the GTP-U packet at the GTP-U packet reception node)/2.

If the first node and the second node are synchronized in time, the first node can determine the interface delay according to one or more of the following methods:

Method B: the interface delay=the reception time point of the first NR-U information frame at the GTP-U packet transmission node (for example, the first node)−the transmission time point of the first NR-U information frame at the GTP-U packet reception node (for example, the second node).

Method C: the interface delay=the reception time point of the GTP-U packet at the GTP-U packet reception node (for example, the second node)−the transmission time point of the GTP-U packet at the GTP-U packet transmission node (for example, the first node).

Example 2

The first node transmits a GTP-U packet to the second node. After receiving the GTP-U packet, the second node transmits a second NR-U information frame or a second message containing parameters related to a feedback delay of the GTP-U packet at the GTP-U packet reception node (for example, the second node) to the first node, in order that the first node can obtain the feedback delay of the GTP-U packet at the GTP-U packet reception node (for example, the second node), and then determine a transmission delay of the GTP-U packet on an interface (such as a F1-U). The second NR-U information frame may be assistance information data, DL data delivery status, or a newly defined information frame. The second message may be a message of F1 or NG or E1 or Xn or X2. The second NR-U information frame or the second message includes one or more of the followings:

A feedback delay of the GTP-U packet: used to indicate a feedback delay of the GTP-U packet at the GTP-U packet reception node (for example, the second node). The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNs required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

A feedback delay of the GTP-U packet reception node: used to indicate an average feedback delay of the GTP-U packet at the GTP-U packet reception node (for example, the second node) for a period of time. The period of time may be determined by the implementation of the GTP-U packet reception node (for example, the second node) or configured by the first node.

A feedback delay of a non-retransmitted packet at the GTP-U packet reception node: used to indicate an average feedback delay of the non-retransmitted GTP-U packet at the GTP-U packet reception node (for example, the second node) for a period of time. The period of time may be determined by the implementation of the GTP-U packet reception node (for example, the second node) or configured by the first node.

A GTP-U packet retransmission indication: used to indicate whether the GTP-U packet has been retransmitted at the GTP-U packet reception node (for example, the second node). This indication may be indicated by one bit, for example, when the bit is 1, it means that the GTP-U packet has been retransmitted, when the bit is 0, it means that the GTP-U packet has not been retransmitted, or when the bit is 0, it means that the GTP-U packet has been retransmitted, and when the bit is 1, it means that the GTP-U packet has not been retransmitted. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNS required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

A GTP-U packet Radio Link Control (RLC) retransmission indication: used to indicate whether the GTP-U packet has experienced RLC retransmission at the GTP-U packet reception node (for example, the second node). This indication may be indicated by one bit, for example, when the bit is 1, it means that the GTP-U packet has experienced RLC retransmission, when the bit is 0, it means that the GTP-U packet has not experienced RLC retransmission, or when the bit is 0, it means that the GTP-U packet has experienced RLC retransmission, and when the bit is 1, it means that the GTP-U packet has not experienced RLC retransmission. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNS received by the reception node, a GTP-U packet indicated by one or more NR PDCP PDU SNs required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

A GTP-U packet hybrid automatic repeat request (HARQ) retransmission indication: used to indicate whether the GTP-U packet has experienced HARQ retransmission at the GTP-U packet reception node (for example, the second node). This indication may be indicated by one bit, for example, when the bit is 1, it means that the GTP-U packet has experienced HARQ retransmission, when the bit is 0, it means that the GTP-U packet has not experienced HARQ retransmission, or when the bit is 0, it means that the GTP-U packet has experienced HARQ retransmission, and when the bit is 1, it means that the GTP-U packet has not experienced HARQ retransmission. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNs required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

The first node receives the second NR-U information frame or the second message containing parameters related to a feedback delay of the GTP-U packet at the GTP-U packet reception node (for example, the second node), and the first node can determine or obtain the feedback delay of the GTP-U packet at the GTP-U packet reception node according to one or more of the following methods:

Method 2: The feedback delay of the GTP-U packet at the GTP-U packet reception node=the feedback delay of the GTP-U packet Method 3: The feedback delay of the GTP-U packet at the GTP-U packet reception node=the feedback delay of the GTP-U packet at the GTP-U packet reception node Method 4: The feedback delay of the GTP-U packet at the GTP-U packet reception node=the feedback delay of the non-retransmitted packet at the GTP-U packet reception node Method 5: When the GTP-U packet retransmission indication indicates that there has been no retransmission (including no RLC retransmission and/or no HARQ retransmission), the feedback delay of the GTP-U packet at the GTP-U packet reception node=the feedback delay of the non-retransmitted packet at the GTP-U packet reception node.

Therefore, after the first node obtains the feedback delay of the GTP-U packet at the GTP-U packet reception node (for example, the second node) according to the above methods, the first node can determine the interface delay according to the following method:

Method A: the interface delay=(a reception time point of the second NR-U information frame at the GTP-U packet transmission node (for example, the first node)−a transmission time point of the GTP-U packet−the feedback delay of the GTP-U packet at the GTP-U packet reception node)/2.

Example 3

The first node transmits a GTP-U packet to the second node. After receiving the GTP-U packet, the second node transmits a third NR-U information frame or a third message containing parameters related to a feedback delay of the GTP-U packet at a GTP-U packet reception node (for example, the second node) to the first node, in order that the first node can determine a transmission delay of the GTP-U packet on an interface (such as F1-U). The third NR-U information frame may be assistance information data, DL data delivery status, or a newly defined information frame. The third message may be a message of F1 or NG or E1 or Xn or X2. The third NR-U information frame or the third message includes one or more of the followings:

A GTP-U packet retransmission indication: used to indicate whether the GTP-U packet has been retransmitted at the GTP-U packet reception node (for example, the second node). This indication may be indicated by one bit, for example, when the bit is 1, it means that the GTP-U packet has been retransmitted, when the bit is 0, it means that the GTP-U packet has not been retransmitted, or when the bit is 0, it means that the GTP-U packet has been retransmitted, and when the bit is 1, it means that the GTP-U packet has not been retransmitted. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNS required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

A GTP-U packet RLC retransmission indication: used to indicate whether the GTP-U packet has experienced RLC retransmission at the GTP-U packet reception node (for example, the second node). This indication may be indicated by one bit, for example, when the bit is 1, it means that the GTP-U packet has experienced RLC retransmission, when the bit is 0, it means that the GTP-U packet has not experienced RLC retransmission, or when the bit is 0, it means that the GTP-U packet has experienced RLC retransmission, and when the bit is 1, it means that the GTP-U packet has not experienced RLC retransmission. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNS required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

A GTP-U packet HARQ retransmission indication: used to indicate whether the GTP-U packet has experienced HARQ retransmission at the GTP-U packet reception node (for example, the second node). This indication may be indicated by one bit, for example, when the bit is 1, it means that the GTP-U packet has experienced HARQ retransmission, when the bit is 0, it means that the GTP-U packet has not experienced HARQ retransmission, or when the bit is 0, it means that the GTP-U packet has experienced HARQ retransmission, and when the bit is 1, it means that the GTP-U packet has not experienced HARQ retransmission. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNS required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

A feedback delay of a non-retransmitted packet at the GTP-U packet reception node: used to indicate an average feedback delay of the non-retransmitted GTP-U packet at the GTP-U packet reception node for a period of time. The period of time may be determined by the implementation of the GTP-U packet reception node (for example, the second node) or configured by the first node.

A waiting time of GTP-U packet reception node: used to indicate an average time interval between receiving an Acknowledgement (ACK) or a Negative Acknowledgements (NACK) of the GTP-U packet and transmitting the third NR-U information frame or the third message in the GTP-U packet reception node (for example, the second node). The ACK or NACK may be a RLC ACK or a RLC NACK, or a HARQ ACK or a HARQ NACK.

A waiting time of GTP-U packet: used to indicate a time interval between receiving the ACK or NACK of the GTP-U packet and transmitting the third NR-U information frame or the third message in the GTP-U packet reception node (for example, the second node). The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNs required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc. The ACK or NACK may be a RLC ACK or a RLC NACK, or a HARQ ACK or a HARQ NACK.

The number of RLC retransmissions of the GTP-U packet: used to indicate the number of RLC retransmissions of the GTP-U packet at the GTP-U packet reception node (for example, the second node). The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNS required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

The number of HARQ retransmissions of the GTP-U packet: used to indicate the number of HARQ retransmissions of the GTP-U packet for a single RLC transmission at the GTP-U packet reception node (for example, the second node). The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNs required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

The cumulative number of HARQ retransmissions of the GTP-U packet: used to indicate the cumulative number of HARQ retransmissions of the GTP-U packet for all RLC transmissions at the GTP-U packet reception node (for example, the second node). The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNs required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

A D1 delay: used to indicate a D1 delay and/or an average D1 delay counted and/or determined by the GTP-U packet reception node (for example, the second node). The D1 delay is a DL delay in over-the-air interface.

A D1 delay of the GTP-U packet: used to indicate the D1 delay of the GTP-U packet determined by the GTP-U packet reception node (for example, the second node). The D1 delay is a DL delay in over-the-air interface. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNS received by the reception node, a GTP-U packet indicated by one or more NR PDCP PDU SNs required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

A D2 delay: used to indicate a D2 delay and/or an average D2 delay counted and/or determined by the GTP-U packet reception node (for example, the second node). The D2 delay is a DL delay on gNB-DU.

A D2 delay of the GTP-U packet: used to indicate the D2 delay of the GTP-U packet determined by the GTP-U packet reception node (for example, the second node). The D2 delay is a DL delay on gNB-DU. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNS received by the reception node, a GTP-U packet indicated by one or more NR PDCP PDU SNs required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

The first node receives the third NR-U information frame or the third message containing parameters related to the feedback delay of the GTP-U packet at the GTP-U packet reception node (for example, the second node), and the first node can determine or obtain the feedback delay of the GTP-U packet at the GTP-U packet reception node (for example, the second node) according to one or more of the following methods:

Method 6: The feedback delay of the GTP-U packet at the GTP-U packet reception node=a DL delay DU result+the waiting time of GTP-U packet reception node Method 7: When the GTP-U packet retransmission indication indicates that there has been no retransmission (including no RLC retransmission and/or no HARQ retransmission), the feedback delay of the GTP-U packet at the GTP-U packet reception node=the DL delay DU result+the waiting time of GTP-U packet reception node Method 8: The feedback delay of the GTP-U packet at the GTP-U packet reception node=the DL delay DU result+the waiting time of GTP-U packet Method 9: When the GTP-U packet retransmission indication indicates that there has been no retransmission (including no RLC retransmission and/or no HARQ retransmission), the feedback delay of the GTP-U packet at the GTP-U packet reception node=the DL delay DU result+the waiting time of GTP-U packet Method 10: The feedback delay of the GTP-U packet at the GTP-U packet reception node=the number of RLC retransmissions of the GTP-U packet*the D2 delay of the GTP-U packet+(the number of RLC retransmissions of the GTP-U packet+the number 1 of HARQ retransmissions of the GTP-U packet+the number 2 of HARQ retransmissions of the GTP-U packet . . . )*the D1 delay of the GTP-U packet+the feedback delay of the non-retransmitted GTP-U packet at the GTP-U packet reception node Method 11: The feedback delay of the GTP-U packet at the GTP-U packet reception node=the number of RLC retransmissions of the GTP-U packet*the D2 delay+(the number of RLC retransmissions of the GTP-U packet+the number 1 of HARQ retransmissions of the GTP-U packet+the number 2 of HARQ retransmissions of the GTP-U packet . . . )*the D1 delay+the feedback delay of the non-retransmitted packet at the GTP-U packet reception node Method 12: the feedback delay of the GTP-U packet at the GTP-U packet reception node=the number of RLC retransmissions of the GTP-U packet*the D2 delay of the GTP-U packet+(the number of RLC retransmissions of the GTP-U packet+the cumulative number of HARQ retransmissions of the GTP-U packet)*the D1 delay of the GTP-U packet+the feedback delay of the non-retransmitted packet of the GTP-U packet at the GTP-U packet reception node Method 13: The feedback delay of the GTP-U packet at the GTP-U packet reception node=the number of RLC retransmissions of the GTP-U packet*the D2 delay+(the number of RLC retransmissions of the GTP-U packet+the cumulative number of HARQ retransmissions of the GTP-U packet)*the D1 delay+the feedback delay of the non-retransmitted packet at the GTP-U packet reception node Method 14: The feedback delay of the GTP-U packet at the GTP-U packet reception node=(1+the number of RLC retransmissions of the GTP-U packet)*the D2 delay of the GTP-U packet+(1+the number of RLC retransmissions of the GTP-U packet+the number 1 of HARQ retransmissions of the GTP-U packet+the number 2 of HARQ retransmissions of the GTP-U packet . . . )*the D1 delay of the GTP-U packet+the waiting time of GTP-U packet or the waiting time of GTP-U packet reception node Method 15: The feedback delay of the GTP-U packet at the GTP-U packet reception node=(1+the number of RLC retransmissions of the GTP-U packet)*the D2 delay+(1+the number of RLC retransmissions of the GTP-U packet+the number 1 of HARQ retransmissions of the GTP-U packet+the number 2 of HARQ retransmissions of the GTP-U packet . . . )*the D1 delay+the waiting time of GTP-U packet or the waiting time of GTP-U packet reception node Method 16: The feedback delay of the GTP-U packet at the GTP-U packet reception node=(1+the number of RLC retransmissions of the GTP-U packet)*the D2 delay of the GTP-U packet+(1+the number of RLC retransmissions of the GTP-U packet+the cumulative number of HARQ retransmissions of the GTP-U packet)*the D1 delay of the GTP-U packet+the waiting time of GTP-U packet or the waiting time of GTP-U packet reception node Method 17: The feedback delay of the GTP-U packet at the GTP-U packet reception node=(1+the number of RLC retransmissions of the GTP-U packet)*the D2 delay+(1+the number of RLC retransmissions of the GTP-U packet+the cumulative number of HARQ retransmissions of the GTP-U packet)*the D1 delay+the waiting time of GTP-U packet or the waiting time of GTP-U packet reception node.

Method 18: When the GTP-U packet has experienced RLC retransmission but has not experienced HARQ transmission, the feedback delay of the GTP-U packet of the GTP-U packet reception node=(1+the number of RLC retransmissions of the GTP-U packet)*the feedback delay of the GTP-U packet reception node.

Method 19: When the GTP-U packet has experienced RLC retransmission but has not experienced HARQ transmission, the feedback delay of the GTP-U packet at the GTP-U packet reception node is equal to (1+the number of RLC retransmissions of the GTP-U packet)*the feedback delay of the non-retransmitted packet at the GTP-U packet reception node Method 20: When the GTP-U packet has experienced RLC retransmission but has not experienced HARQ transmission, the feedback delay of the GTP-U packet at the GTP-U packet reception node is equal to (1+the number of RLC retransmissions of the GTP-U packet)*the DL delay DU result+the waiting time of GTP-U packet reception node Method 21: When the GTP-U packet has experienced RLC retransmission but has not experienced HARQ transmission, the feedback delay of the GTP-U packet at the GTP-U packet reception node=(1+the number of RLC retransmissions of the GTP-U packet)*the DL delay DU result+the waiting time of GTP-U packet Therefore, after the first node obtains the feedback delay of the GTP-U packet at the GTP-U packet reception node (for example, the second node) according to the above method, the first node can determine the interface delay according to the following method:

Method A: the interface delay=(the reception time point of the third NR-U information frame at the GTP-U packet transmission node (for example, the first node)−the transmission time point of the GTP-U packet−the feedback delay of the GTP-U packet at the GTP-U packet reception node)/2.

Example 4

The first node transmits a GTP-U packet to the second node. After receiving the GTP-U packet, the second node transmits a fourth NR-U information frame or a fourth message containing parameters related to an interface delay to the first node, in order that the first node can obtain a transmission delay or a measurement delay of the interface delay (such as F1-U) between the first node and the second node of the GTP-U packet. The fourth NR-U information frame may be assistance information data, DL data delivery status, or a newly defined information frame. The fourth message may be a message of F1 or NG or E1 or Xn or X2. The fourth NR-U information frame or the fourth message includes one or more of the followings:

A D3 delay: used to indicate a D3 delay or an average D3 delay counted and/or determined by the GTP-U packet reception node (for example, the second node). The D3 delay is a DL delay on F1-U.

A D3 delay of the GTP-U packet: used to indicate a D3 delay of the GTP-U packet determined by the GTP-U packet reception node (for example, the second node). The D3 delay is a DL delay on F1-U. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNS required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

An inter-node interface delay: used to indicate a counted and/or determined interface delay and/or average interface delay between nodes. The interface delay may be a delay of F1 and/or E1 and/or Xn and/or X2 and/or NG.

A measurement delay: used to indicate a delay of measurements. The measurement delay may include one or more of the followings:

A delay type: used to indicate the type of delay. The delay type can include one or more of the followings: D1 DL delay in over-the-air interface, D2 DL delay on gNB-DU, D3 DL delay on F1-U, D4 DL delay in CU-UP, D1 UL PDCP packet average delay, D2.1 average over-the-air interface packet delay, D2.2 average RLC packet delay, D2.3 average delay UL on F1-U, D2.4 average PDCP re-ordering delay. Wherein, the D1 DL delay in over-the-air interface, the D2 DL delay on gNB-DU, the D3 DL delay on F1-U and the D4 DL delay in CU-UP belong to downlink delays. The D1 UL PDCP packet average delay, the D2.1 average over-the-air interface packet delay, the D2.2 average RLC packet delay, the D2.3 average delay UL on F1-U and the D2.4 average PDCP re-ordering delay belong to uplink delays.

measurement result: used to indicate a result of the measurement of the delay.

Therefore, the first node can obtain the interface delay as follows:

Method D: the interface delay=the D3 delay

Method E: the interface delay=the D3 delay of the GTP-U packet

Method F: the interface delay=the inter-node interface delay

Example 5

The first node transmits the GTP-U packet carrying the transmission time in a fifth NR-U information frame to the second node. After receiving the GTP-U packet, the second node transmits the fourth NR-U information frame or the fourth message containing parameters related to an interface delay of the GTP-U packet to the first node, in order that the first node can obtain a transmission delay of the GTP-U packet on an interface (such as F1-U), or after receiving the GTP-U packet, the second node transmits the first NR-U information frame or the first message, and/or the second NR-U information frame or the second message, and/or the third NR-U information frame or the third message containing parameters related to the timestamp or feedback delay of the GTP-U packet at the GTP-U packet reception node (for example, the second node) to the first node, in order that the first node can obtain or determine the feedback delay of the GTP-U packet on the interface (such as F1-U). The fifth NR-U information frame may be DL user data. The fifth NR-U information frame includes one or more of the followings:

A transmission time point of the GTP-U packet: used to indicate the transmission time point of the GTP-U packet at the GTP-U packet transmission node (for example, the first node), which may be a relative time point or an absolute time point.

If the first node and the second node are time synchronized, the second node can determine the interface delay according to the following method:

Method C: the interface delay=the reception time point of the GTP-U packet at the GTP-U packet reception node–the transmission time point of the GTP-U packet at the GTP-U packet transmission node (for example, the first node).

The first node may also obtain or determine the feedback delay of the GTP-U packet at the GTP-U packet reception node (for example, the second node) according to the above-mentioned method 1 to method 21, and/or obtain or determine the interface delay of the GTP-U packet according to the above-mentioned method A to method F.

Example 6

The first node transmits a GTP-U packet carrying a delay feedback requirement in a sixth NR-U information frame or a sixth message carrying the delay feedback requirement to the second node, so that the second node can know the related requirements of the delay to be fed back. After receiving the GTP-U packet containing the sixth NR-U information frame or the sixth message, the second node transmits an information frame or message containing the related delay parameters to the first node according to the feedback requirement. For example, after receiving the GTP-U packet, the second node transmits the fourth NR-U information frame or the fourth message containing parameters related to an interface delay of the GTP-U packet at the GTP-U packet reception node to the first node, in order that the first node can obtain an transmission delay of the GTP-U packet at an interface (such as F1-U), or, after receiving the GTP-U packet, the second node may transmit the first NR-U information frame or the first message, and/or the second NR-U information frame or the second message, and/or the third NR-U information frame or the third message containing parameters related to the timestamp or the feedback delay of the GTP-U packet at the GTP-U packet reception node to the first node, in order that the first node can obtain or determine the feedback delay of the GTP-U packet at the GTP-U packet reception node, thereby the first node determines and obtains the transmission delay of the GTP-U packet at the interface (such as the F1-U). The sixth NR-U information frame may be DL user data. The sixth message may be a message of F1 or NG or E1 or Xn or X2. The sixth NR-U information frame or the sixth message includes one or more of the followings:

A feedback delay report polling: used to indicate whether parameters related to the feedback delay need to be reported. This field may be represented by 1 bit. For example, when this bit is 1, parameters related to feedback delay need to be reported; when this bit is 0, parameters related to feedback delay do not need to be reported; or when this bit is 0, parameters related to feedback delay need to be reported; when this bit is 1, parameters related to feedback delay do not need to be reported. The parameters related to feedback delay include one or more of the followings: the reception time point of the GTP-U packet; the transmission time point of first information at the GTP-U packet reception node; the reception time point of the first information at the GTP-U packet transmission node; the transmission time point of the GTP-U packet; the feedback delay of the GTP-U packet; the feedback delay of the GTP-U packet reception node; the feedback delay of the non-retransmitted packet at the GTP-U packet reception node; the GTP-U packet retransmission indication; the GTP-U packet radio link control (RLC) retransmission indication; the GTP-U packet hybrid automatic repeat request (HARQ) retransmission indication; the waiting time of GTP-U packet reception node; the waiting time of GTP-U packet; the number of RLC retransmissions of the GTP-U packet; the number of HARQ retransmissions of the GTP-U packet; the cumulative number of HARQ retransmissions of the GTP-U packet; the D3 delay; the D3 delay of the GTP-U packet; the inter-node interface delay; the measurement delay.

A DU Feedback delay time report polling: used to indicate whether parameters related to the DU feedback delay time need to be reported. This field may be represented by one bit. For example, when this bit is 1, it is necessary to report the parameters related to DU feedback delay; when this bit is 0, it is not necessary to report the parameters related to the DU feedback delay; or when this bit is 0, it is necessary to report the parameters related to the DU feedback delay; when this bit is 1, it is not necessary to report the parameters related to the DU feedback delay. The parameters related to feedback delay include one or more of the followings: the reception time point of the GTP-U packet; the transmission time point of first information at the GTP-U packet reception node; the reception time point of the first information at the GTP-U packet transmission node; the transmission time point of the GTP-U packet; the feedback delay of the GTP-U packet; the feedback delay of the GTP-U packet reception node; the feedback delay of the non-retransmitted packet at the GTP-U packet reception node; the GTP-U packet retransmission indication; the GTP-U packet radio link control (RLC) retransmission indication; the GTP-U packet hybrid automatic repeat request (HARQ) retransmission indication; the waiting time of GTP-U packet reception node; the waiting time of GTP-U packet; the number of RLC retransmissions of the GTP-U packet; the number of HARQ retransmissions of the GTP-U packet; the cumulative number of HARQ retransmissions of the GTP-U packet; the D3 delay; the D3 delay of the GTP-U packet; the inter-node interface delay; the measurement delay.

A F1-U delay measurement report polling: used to indicate whether it is necessary to report parameters related to the F1-U delay measurement. This field may be represented by one bit. For example, when this bit is 1, it is necessary to report the parameters related to F1-U delay measurement; when this bit is 0, it is not necessary to report the parameters related to F1-U delay measurement; or when this bit is 0, it is necessary to report the parameters related to F1-U delay measurement; when this bit is 1, it is not necessary to report the parameters related to F1-U delay measurement. The parameters related to F1-U delay measurement include one or more of the followings: the reception time point of the GTP-U packet; the transmission time point of first information at the GTP-U packet reception node; the reception time point of the first information at the GTP-U packet transmission node; the transmission time point of the GTP-U packet; the feedback delay of the GTP-U packet; the feedback delay of the GTP-U packet reception node; the feedback delay of the non-retransmitted packet at the GTP-U packet reception node; the GTP-U packet retransmission indication; the GTP-U packet radio link control (RLC) retransmission indication; the GTP-U packet hybrid automatic repeat request (HARQ) retransmission indication; the waiting time of GTP-U packet reception node; the waiting time of GTP-U packet; the number of RLC retransmissions of the GTP-U packet; the number of HARQ retransmissions of the GTP-U packet; the cumulative number of HARQ retransmissions of the GTP-U packet; the D3 delay; the D3 delay of the GTP-U packet; the inter-node interface delay; the measurement delay.

A delay measurement report polling: used to indicate whether parameters related to the delay measurement need to be reported. This field may be represented by 1 bit. For example, when this bit is 1, the parameters related to the delay measurement need to be reported; when this bit is 0, the parameters related to the delay measurement do not need to be reported; or when this bit is 0, the parameters related to the delay measurement need to be reported; when this bit is 1, the parameters related to the delay measurement do not need to be reported. The parameters related to the delay measurement include one or more of the followings: the reception time point of the GTP-U packet; the transmission time point of first information at the GTP-U packet reception node; the reception time point of the first information at the GTP-U packet transmission node; the transmission time point of the GTP-U packet; the feedback delay of the GTP-U packet; the feedback delay of the GTP-U packet reception node; the feedback delay of the non-retransmitted packet at the GTP-U packet reception node; the GTP-U packet retransmission indication; the GTP-U packet radio link control (RLC) retransmission indication; the GTP-U packet hybrid automatic repeat request (HARQ) retransmission indication; the waiting time of GTP-U packet reception node; the waiting time of GTP-U packet; the number of RLC retransmissions of the GTP-U packet; the number of HARQ retransmissions of the GTP-U packet; the cumulative number of HARQ retransmissions of the GTP-U packet; the D3 delay; the D3 delay of the GTP-U packet; the inter-node interface delay; the measurement delay.

A NR PDCP SN that needs to report the delay parameters: used to indicate the NR PDCP SN to which one or more GTP-U packets for which the delay parameters need to be measured or calculated belong. The NR PDCP SN that needs to report the delay parameters may be a single NR PDCP SN, and/or a plurality of NR PDCP SNs, and/or a NR PDCP SN list, and/or a start value of NR PDCP SNs and/or an end value of NR PDCP SNs.

A delay direction: used to indicate the measurement direction of the delay that needs to be fed back, such as an uplink delay and a downlink delay.

A delay type: used to indicate the type of delay. The delay type can include one or more of the followings: D1 DL delay in over-the-air interface, D2 DL delay on gNB-DU, D3 DL delay on F1-U, D4 DL delay in CU-UP, D1 UL PDCP packet average delay, D2.1 average over-the-air interface packet delay, D2.2 average RLC packet delay, D2.3 average delay UL on F1-U, D2.4 average PDCP re-ordering delay. Wherein, the D1 DL delay in over-the-air interface, the D2 DL delay on gNB-DU, the D3 DL delay on F1-U and the D4 DL delay in CU-UP belong to downlink delays. The D1 UL PDCP packet average delay, the D2.1 average over-the-air interface packet delay, the D2.2 average RLC packet delay, the D2.3 average delay UL on F1-U and the D2.4 average PDCP re-ordering delay belong to uplink delays.

A delay parameter type: used to indicate the parameters that need feedback. The delay parameter type may include one or more of the parameters contained in the first NR-U information frame or the first message, and/or the second NR-U information frame or the second message, and/or the third NR-U information frame or the third message, and/or the fourth NR-U information frame or the fourth message as mentioned above.

A feedback granularity: used to indicate a granularity of parameters needing feedback, such as a UE level, a DRB level, a PDU Session level, a statistical average level, etc.

A result report type: used to indicate whether the delay measurement result is reported once or periodically. The report type includes but are not limited to: an on-demand type, a periodic type, etc.

A result report period: used to indicate an interval of periodic reports of delay prediction results. If there is no content in this field, it means that a single report is enough.

A single or any combination of the above parameters can trigger the second node to report the delay parameters.

The first node can obtain or determine the feedback delay of the GTP-U packet at the GTP-U packet reception node (for example, the second node) according to the above-mentioned methods 1 to 21, and/or obtain or determine the interface delay of the GTP-U packet according to the above-mentioned methods A to F.

The second node can trigger and report the delay parameters as follows:

Scheme 1: When the report polling indicates that the report is needed, for example, in one implementation, this field is 1, the second node reports the parameters related to the delay of the GTP-U packet according to the received report requirement. The report polling may be a report polling indicating feedback delay time reporting, DU feedback delay time reporting, F1-U delay measurement related data reporting, delay measurement related data reporting, downlink data delivery status reporting, assistance information data reporting, etc. The GTP-U packet may be one or more of the followings: a GTP-U packet or NR-U information frame where report polling is located, a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNS required to report delay parameters received by the reception node, a GTP-U packet indicated by one or more NR PDCP PDU SNS.

Scheme 2: When the NR PDCP SN that needs to report exists and indicates a related GTP-U packet, the second node reports the parameters related to the delay of the GTP-U packet according to the received report requirement. The NR PDCP SN that needs to report may be a NR PDCP SN that needs to report the delay parameters, or it can also be a DL Report NR PDCP PDU SN. The GTP-U packet may be a GTP-U packet indicated by the NR PDCP SN that needs to report.

Scheme 3: When the report polling indicates that report is needed, for example, in one implementation, this field is 1, and the NR PDCP SN that needs to report exists and indicates a related GTP-U packet, the second node reports the parameters related to the delay of the GTP-U packet according to the received report requirement. The report polling may be a report polling indicating feedback delay time reporting, DU feedback delay time reporting, F1-U delay measurement related data reporting, delay measurement related data reporting, downlink data delivery status reporting, assistance information data reporting, etc. The NR PDCP SN that needs to report may be a NR PDCP SN that needs to report the delay parameters, or it can also be a DL Report NR PDCP PDU SN. The GTP-U packet may be a GTP-U packet indicated by the NR PDCP SN that needs to report.

Scheme 4: When the second node receives a QoS monitoring request and the QoS monitoring request indicates that QoS monitoring is needed, the second node reports the parameters related to the delay of the GTP-U packet according to the received report requirement. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNs required to report delay parameters received by the reception node, a GTP-U packet indicated by one or more NR PDCP PDU SNS.

Scheme 5: When the second node receives a QoS monitoring request and the QoS monitoring request indicates that QoS monitoring is needed, and the report polling indicates that report is needed, for example, in one implementation, this field is 1, and the second node reports the parameters related to the delay of the GTP-U packet according to the received report requirement. The report polling may be a report polling indicating feedback delay time reporting, DU feedback delay time reporting, F1-U delay measurement related data reporting, delay measurement related data reporting, downlink data delivery status reporting, assistance information data reporting, etc. The GTP-U packet may be one or more of the followings: a NR-U information frame or a GTP-U packet where report polling is located, a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNs required to report delay parameters received by the reception node, a GTP-U packet indicated by one or more NR PDCP PDU SNS.

Scheme 6: When the second node receives a QoS monitoring request and the QoS monitoring request indicates that QoS monitoring is needed, and the NR PDCP SN that needs to be report exists and indicates a related GTP-U packet, the second node reports the parameters related to the delay of the GTP-U packet according to the received report requirement. The NR PDCP SN that needs to report may be a NR PDCP SN that needs to report the delay parameters, or it can also be a DL Report NR PDCP PDU SN. The GTP-U packet may be a GTP-U packet indicated by the NR PDCP SN that needs to report.

Scheme 7: When the second node receives a QoS monitoring request and the QoS monitoring request indicates that QoS monitoring is needed, and when the report polling indicates that report is needed, for example, in one implementation, when the field is 1 and the NR PDCP SN that needs to report exists and indicates a related GTP-U packet exists, the second node reports the parameters related to the delay of the GTP-U packet according to the received report requirement. The report polling may be a report polling indicating feedback delay time reporting, DU feedback delay time reporting, F1-U delay measurement related data reporting, delay measurement related data reporting, downlink data delivery status reporting, assistance information data reporting, etc. The NR PDCP SN that needs to report may be a NR PDCP SN that needs to report the delay parameters, or it can also be a DL Report NR PDCP PDU SN. The GTP-U packet may be a GTP-U packet indicated by the NR PDCP SN that needs to report.

A single or any combination of the above schemes can trigger the second node to report the delay parameters.

Example 7

The first node receives a seventh NR-U information frame or a seventh message, transmitted by the second node, which contains parameters related to a feedback delay of the GTP-U packet at the second node or other nodes, in order that the first node can determine or obtain a transmission delay of the GTP-U packet on an interface (such as F1-U). The seventh NR-U information frame may be assistance information data, a DL data delivery status or a newly defined information frame. The seventh message may be a gNB-CU-CP measurement result information message of E1, or other messages of E1 or F1 or NG or Xn or X2. The seventh NR-U information frame or the seventh message includes one or more of the followings:

A D3 delay: used to indicate a counted and/or determined D3 delay and/or average D3 delay. And the D3 delay is a DL delay on F1-U.

A D3 delay of the GTP-U packet: used to indicate the determined D3 delay of the GTP-U packet. And the D3 delay is a DL delay on F1-U. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNS received by the reception node, a GTP-U packet indicated by one or more NR PDCP PDU SNs required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

An inter-node interface delay: used to indicate a counted and/or determined interface delay and/or average interface delay between nodes. The interface delay may be a delay of F1 and/or E1 and/or Xn and/or X2 and/or NG.

A measurement delay: used to indicate the measurement of the delay. The delay measurement may include one or more of the followings:

- A delay type: used to indicate the type of delay. The delay type can include one or more of the followings: D1 DL delay in over-the-air interface, D2 DL delay on gNB-DU, D3 DL delay on F1-U, D4 DL delay in CU-UP, D1 UL PDCP packet average delay, D2.1 average over-the-air interface packet delay, D2.2 average RLC packet delay, D2.3 average delay UL on F1-U, D2.4 average PDCP re-ordering delay. Wherein, the D1 DL delay in over-the-air interface, the D2 DL delay on gNB-DU, the D3 DL delay on F1-U and the D4 DL delay in CU-UP belong to downlink delays. The D1 UL PDCP packet average delay, the D2.1 average over-the-air interface packet delay, the D2.2 average RLC packet delay, the D2.3 average delay UL on F1-U and the D2.4 average PDCP re-ordering delay belong to uplink delays.
- Measurement result: used to indicate a result of the measurement of the delay.

A reception time point of the GTP-U packet: used to indicate the reception time point of the GTP-U packet at the GTP-U packet reception node, which may be a relative time point or an absolute time point. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNS required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

A transmission time point of the NR-U information frame or the first message: used to indicate the transmission time point of the first NR-U information frame or the first message at the GTP-U packet reception node. The transmission time point may be a relative time point or an absolute time point.

A feedback delay of the GTP-U packet: used to indicate the feedback delay of the GTP-U packet at the GTP-U packet reception node. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNS received by the reception node, a GTP-U packet indicated by one or more NR PDCP PDU SNs required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

A feedback delay of the GTP-U packet reception node: used to indicate an average feedback delay of the GTP-U packet at the GTP-U packet reception node for a period of time. The period of time may be determined by the implementation of the GTP-U packet reception node or configured by the first node.

A feedback delay of a non-retransmitted packet at the GTP-U packet reception node: used to indicate an average feedback delay of the non-retransmitted GTP-U packet at the GTP-U packet reception node for a period of time. The period of time may be determined by the implementation of the GTP-U packet reception node or configured by the first node.

A GTP-U packet retransmission indication: used to indicate whether the GTP-U packet has been retransmitted at the GTP-U packet reception node. This indication may be indicated by one bit, for example, when the bit is 1, it means that the GTP-U packet has been retransmitted, when the bit is 0, it means that the GTP-U packet has not been retransmitted, or when the bit is 0, it means that the GTP-U packet has been retransmitted, and when the bit is 1, it means that the GTP-U packet has not been retransmitted. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNs required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

A GTP-U packet RLC retransmission indication: used to indicate whether GTP-U packet has experienced RLC retransmission at the GTP-U packet reception node. This indication may be indicated by one bit, for example, when the bit is 1, it means that the GTP-U packet has experienced RLC retransmission, when the bit is 0, it means that the GTP-U packet has not experienced RLC retransmission, or when the bit is 0, it means that the GTP-U packet has experienced RLC retransmission, and when the bit is 1, it means that the GTP-U packet has not experienced RLC retransmission. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNs required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

A GTP-U packet HARQ retransmission indication: used to indicate whether the GTP-U packet has experienced HARQ retransmission at the GTP-U packet reception node. This indication may be indicated by one bit, for example, when the bit is 1, it means that the GTP-U packet has experienced HARQ retransmission, when the bit is 0, it means that the GTP-U packet has not experienced HARQ retransmission, or when the bit is 0, it means that the GTP-U packet has experienced HARQ retransmission, and when the bit is 1, it means that the GTP-U packet has not experienced HARQ retransmission. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNs required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

A waiting time of GTP-U packet reception node: used to indicate an average time interval between receiving an ACK or NACK of the GTP-U packet and transmitting the third NR-U information frame or the third message by the GTP-U packet reception node. The ACK or NACK may be a RLC ACK or a RLC NACK, or a HARQ ACK or a HARQ NACK.

A waiting time of GTP-U packet: used to indicate a time interval between receiving the ACK or NACK of the GTP-U packet and transmitting the third NR-U information frame or the third message by the GTP-U packet reception node. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNs required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc. The ACK or NACK may be a RLC ACK or a RLC NACK, or a HARQ ACK or a HARQ NACK.

The number of RLC retransmissions of the GTP-U packet: used to indicate the number of RLC retransmissions of the GTP-U packet at the GTP-U packet reception node. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNs required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

The number of HARQ retransmissions of the GTP-U packet: used to indicate the number of HARQ retransmissions of the GTP-U packet for a single RLC transmission at the GTP-U packet reception node. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNS required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

The cumulative number of HARQ retransmissions of the GTP-U packet: used to indicate the cumulative number of HARQ retransmissions of the GTP-U packet for all RLC transmissions at the GTP-U packet reception node. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNS received by the reception node, a GTP-U packet indicated by one or more NR PDCP PDU SNs required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

A D1 delay: used to indicate a counted and/or determined D1 delay and/or average D1 delay. The D1 delay is a DL delay in over-the-air interface.

A D1 delay of the GTP-U packet: used to indicate the determined D1 delay of the GTP-U packet. The D1 delay is a DL delay in over-the-air interface. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNs required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

A D2 delay: used to indicate the counted and/or determined D2 delay and/or average D2 delay. The D2 delay is a DL delay on gNB-DU.

A D2 delay of the GTP-U packet: used to indicate the determined D2 delay of the GTP-U packet. The D2 delay is a DL delay on gNB-DU. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNS received by the reception node, a GTP-U packet indicated by one or more NR PDCP PDU SNs required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc.

A reception time point of the seventh NR-U information frame or the seventh message at the GTP-U packet transmission node: the reception time point may be a relative time point or an absolute time point. If the first node is not the GTP-U packet transmission node, the seventh NR-U information frame or the seventh message includes this reception time point; if the first node is the GTP-U packet transmission node, the seventh NR-U information frame or the seventh message does not include this reception time point.

A transmission time point of the GTP-U packet: used to indicate the transmission time point of the GTP-U packet at the GTP-U packet transmission node, which may be a relative time point or an absolute time point. The GTP-U packet may be one or more of the followings: a GTP-U packet indicated by highest successfully delivered NR PDCP Sequence Number, a GTP-U packet indicated by highest transmitted NR PDCP Sequence Number, a GTP-U packet indicated by successfully delivered retransmitted NR PDCP Sequence Number, a GTP-U packet indicated by retransmitted NR PDCP Sequence Number, a GTP-U packet indicated by successfully delivered retransmitted NR PDCP Sequence Number, a GTP-U packet indicated by start of successfully delivered out of sequence PDCP Sequence Number range, a GTP-U packet indicated by end of successfully delivered out of sequence PDCP Sequence Number range, a GTP-U packet indicated by a DL report NR PDCP PDU SN received by the reception node, a GTP-U packet indicated by one or more NR PDCP PDU SNs received by the reception node, a GTP-U packet indicated by one or more NR PDCP PDU SNS required to report delay parameters received by the reception node, a GTP-U packet indicated by one or more NR PDCP PDU SNs, and a NR-U information frame or a GTP-U packet where report polling is located. Wherein, the report polling can indicate feedback delay time reporting, DU feedback delay time reporting, F1-U delay measurement related data reporting, delay measurement related data reporting, downlink data delivery status reporting, assistance information data reporting, etc. If the first node is not the GTP-U packet transmission node, the seventh NR-U information frame or the seventh message includes this transmission time point; if the first node is the GTP-U packet transmission node, the seventh NR-U information frame or the seventh message does not include this transmission time point.

The first node can obtain or determine the feedback delay of the GTP-U packet at the GTP-U packet reception node or other nodes according to the above-mentioned methods 1 to 21, and/or obtain or determine the interface delay of the GTP-U packet according to the above-mentioned methods A to F.

Exemplary embodiments of the present disclosure are further described below with reference to the accompanying drawings.

The text and drawings are provided as examples only to help understand the present disclosure. They should not be construed as limiting the scope of the present disclosure in any way. Although some embodiments and examples have been provided, based on the disclosure herein, it is obvious to those skilled in the art that changes may be made to the illustrated embodiments and examples without departing from the scope of this disclosure.

Figure 3:
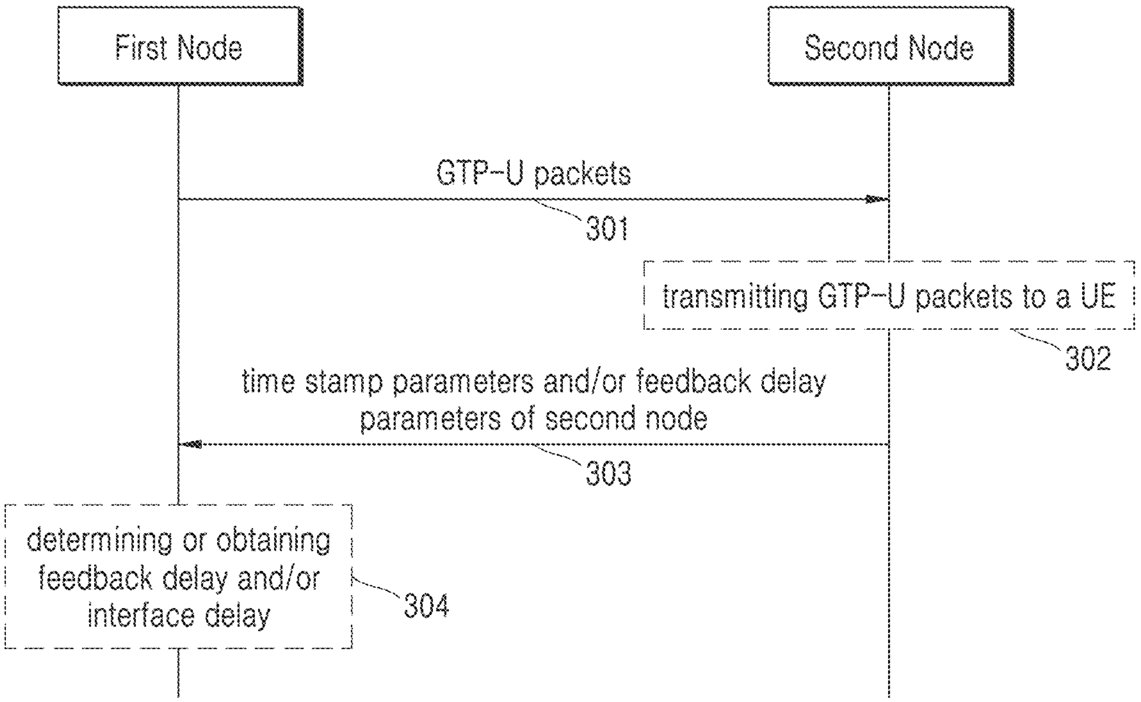
FIG. 3 illustrates a method supporting delay measurement according to an embodiment of the present disclosure.

FIG. 3 illustrates a method supporting delay measurement according to an embodiment of the present disclosure. Specifically, FIG. 3 illustrates a process of interaction of parameters related to a timestamp at a second node and/or feedback delay between nodes, so as to provide a first node with reference information for the first node to determine and/or obtain an interface delay between the first node and the second node. In one implementation, for example, the first node may be a gNB-CU-UP, and the second node may be a gNB-DU; the first node may be a gNB-CU-CP, and the second node may be a gNB-DU; the first node may be a UPF, and the second node may be a gNB or gNB CU-UP or en-gNB or eNB or ng-eNB. However, the present disclosure is not limited to this, and the first node and the second node may be other nodes.

Step 301: The first node transmits a GTP-U packet to the second node.

Step 302: After receiving the GTP-U packet, the second node performs transmission of the packet to a UE.

Step 303: After the second node obtains a result of the transmission, for example, it receives a RLC ACK or NACK for a RLC AM mode and a HARQ ACK or NACK for a RLC UM mode, the second node transmits information including parameters related to the timestamp at the second node and/or parameters related to the feedback delay at the second node of the GTP-U packet to the first node, for the first node to determine a transmission delay of the GTP-U packet on an interface (such as F1-U). In one implementation, for example, the information of the parameters related to the timestamp may be transmitted to the first node by a first NR-U information frame or a first message, and the information of the parameters related to the feedback delay may be transmitted to the first node by a second NR-U information frame or a second message or a third NR-U information frame or a third message.

Step 304: The first node determines or obtains the feedback delay of the second node based on the received information of the parameters related to the timestamp at the second node and/or parameters related to the feedback delay at the second node of the GTP-U, and/or further determines or obtains the interface delay. The determination method can obtain or determine the feedback delay of the GTP-U packet at the second node or other nodes according to the above-mentioned methods 1 to 21, and/or obtain or determine the interface delay of the GTP-U packet according to the above-mentioned methods A to F. After the first node obtains the interface delay, it may transmit the interface delay to other nodes as demand. For example, the first node may transmit via the aforementioned seventh NR-U information frame or seventh message.

Figure 4:
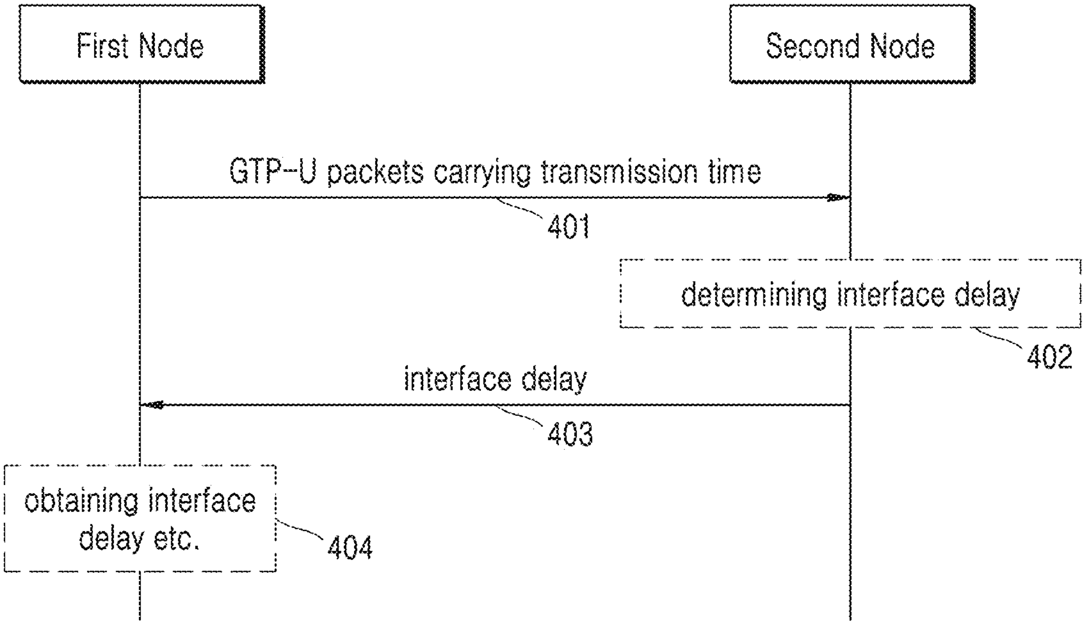
FIG. 4 illustrates a method supporting delay measurement according to an embodiment of the present disclosure.

FIG. 4 illustrates a method supporting delay measurement according to an embodiment of the present disclosure. Specifically, FIG. 4 illustrates a process of interaction between nodes to provide an interface delay between a first node and a second node, to the first node. In one implementation, for example, the first node may be a gNB-CU-UP, and the second node may be a gNB-DU; the first node may be a gNB-CU-CP, and the second node may be a gNB-DU; the first node may be a UPF, and the second node may be a gNB or gNB CU-UP or en-gNB or eNB or ng-eNB. However, the present disclosure is not limited to this, and the first node and the second node may be other nodes.

Step 401: The first node transmits a GTP-U packet carrying a transmission time in a NR-U information frame to the second node. In one implementation, for example, the NR-U information frame may be the aforementioned fifth NR-U information frame.

Step 402: After receiving the GTP-U packet, the second node determines the interface delay between the first node and the second node. The determination method can obtain or determine the interface delay of the GTP-U packet according to the above method C.

Step 403: The second node transmits the determined interface delay to the first node. In one implementation, for example, the interface delay may be transmitted to the first node by the aforementioned fourth NR-U information frame or the fourth message.

Step 404: The first node obtains the interface delay. After the first node obtains the interface delay, it may transmit the interface delay to other nodes as demand. For example, the first node can transmit via the aforementioned seventh NR-U information frame or seventh message.

Figure 5A:
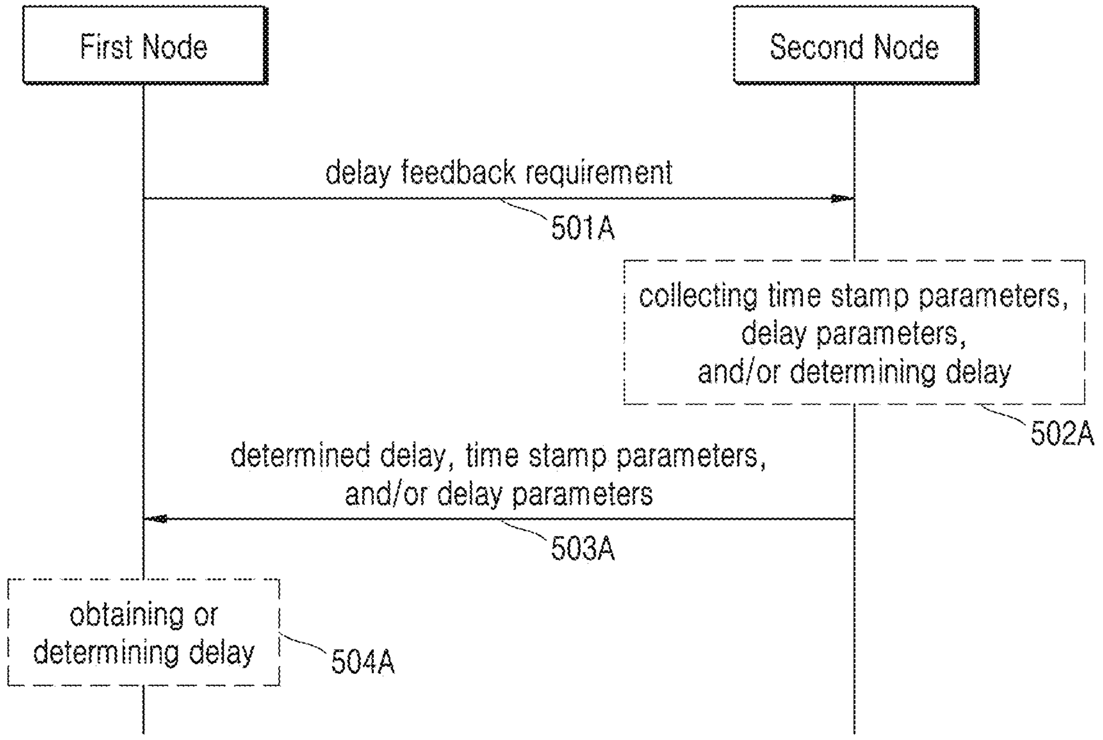
FIG. 5A illustrates a method supporting delay measurement according to an embodiment of the present disclosure.

FIG. 5A illustrates a method supporting delay measurement according to an embodiment of the present disclosure. Specifically, FIG. 5A illustrates a process of interaction of transceiving a delay feedback requirement and feedback of parameters related to a delay between nodes, for example, the second node can provide the parameters related to delay or a measured or determined delay to the first node according to the feedback requirement provided by the first node. In one implementation, for example, the first node may be a gNB-CU-UP, and the second node may be a gNB-DU; the first node may be a gNB-CU-CP, and the second node may be a gNB-DU; the first node may be a UPF, and the second node may be a gNB or gNB CU-UP or en-gNB or eNB or ng-eNB. However, the present disclosure is not limited to this, and the first node and the second node may be other nodes.

Step 501: The first node transmits a delay measurement feedback requirement to the second node. In one implementation, for example, the NR-U information frame may be the aforementioned sixth NR-U information frame or the sixth message.

Step 502: After receiving the delay feedback requirement, the second node collects the parameters or measures the delay as demand, as described in Example 6.

Step 503: The second node feeds back a result of the delay and/or the parameters related to the timestamp at the second node and/or parameters related to the feedback delay at the second node to the first node according to the feedback requirement received in step 501. In one implementation, for example, the result of the delay may be transmitted to the first node by the aforementioned fourth NR-U information or the fourth message, the information of the parameters related to the timestamp may be transmitted to the first node by the aforementioned first NR-U information frame or the first message, and the information of the parameters related to feedback delay may be transmitted to the first node by the aforementioned second NR-U information frame or the second message or the third NR-U information frame or the third message. The determined interface delay is transmitted to the first node.

Step 504: The first node can directly obtain the delay, and/or determine or obtain the feedback delay of the second node based on the received information of the parameters related to the timestamp at the second node and/or the parameters related to the feedback delay at the second node, and/or further determine or obtain the interface delay. The determination method can obtain or determine the feedback delay of the GTP-U packet at the second node or other nodes according to the above-mentioned methods 1 to 21, and/or obtain or determine the interface delay of the GTP-U packet according to the above-mentioned methods A to F. After the first node obtains the interface delay, it may transmit the interface delay to other nodes as demand. For example, the first node can transmit via the aforementioned seventh NR-U information frame or seventh message.

Figure 5B:
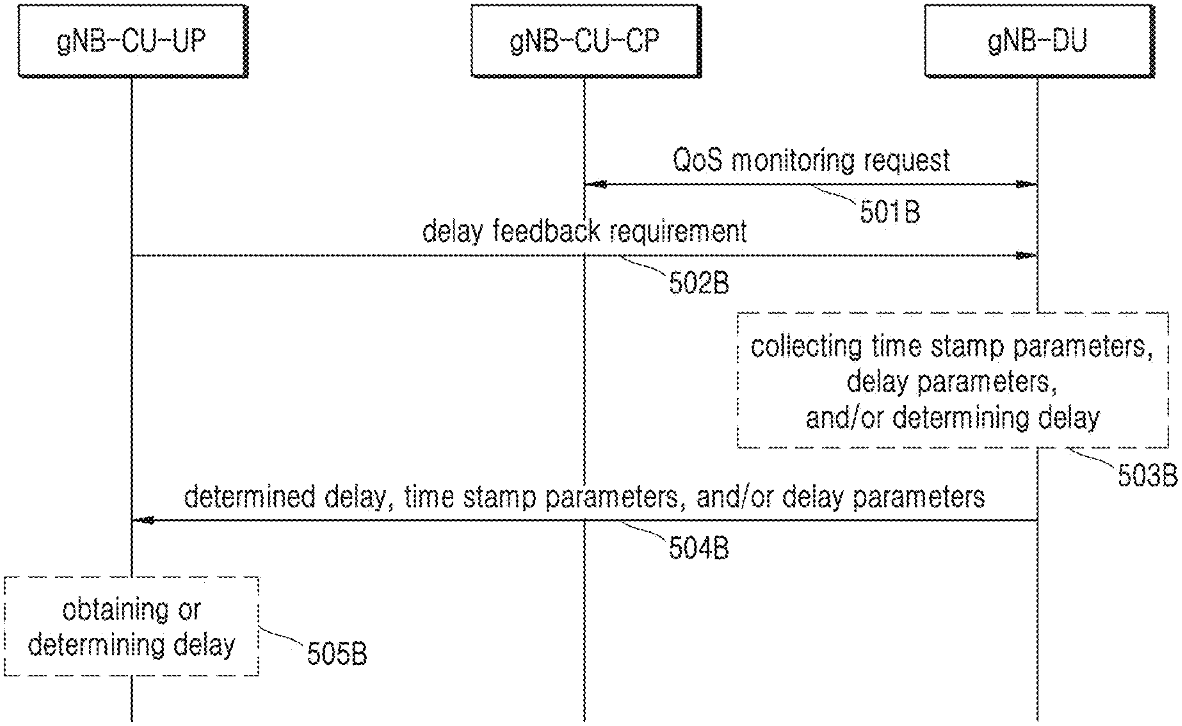
FIG. 5B illustrates a method supporting delay measurement according to an embodiment of the present disclosure.

FIG. 5B illustrates a method supporting delay measurement according to an embodiment of the present disclosure. Specifically, FIG. 5B illustrates a process of interaction between a gNB-CU-CP, a gNB-CU-UP and a gNB-DU, of transceiving a delay feedback requirement and feeds back parameters related to a delay. In one implementation, for example, the gNB-DU can provide the gNB-CU-UP with the parameters related to the delay of the gNB-DU.

Step 501A: The gNB-CU-CP transmits a QoS monitoring request to the gNB-DU.

Step 502A: The gNB-CU-UP transmits a delay feedback requirement to the gNB-DU. In one implementation, for example, the NR-U information frame may be the aforementioned sixth NR-U information frame or the sixth message.

Step 503A: The gNB-DU collects the parameters or measures the delay as demand after receiving the delay feedback requirement, as described in Example 6.

Step 504A: The gNB-DU feeds back a result of the delay and/or parameters related to a timestamp at the gNB-DU and/or parameters related to a feedback delay at the gNB-DU to the gNB-CU-UP according to the feedback requirement received in steps 501A and 502A. In one implementation, for example, the delay result may be transmitted to the first node by the aforementioned fourth NR-U information or the fourth message, the information of the parameters related to the timestamp may be transmitted to the first node by the aforementioned first NR-U information frame or the first message, and the information of parameters related to the feedback delay may be transmitted to the first node by the aforementioned second NR-U information frame or the second message or the third NR-U information frame or the third message.

Step 505A: The gNB-CU-UP can directly obtain the delay, and/or determine or obtain the feedback delay at the gNB-DU based on the received information of the parameters related to the timestamp at the gNB-DU and/or the parameters related to feedback delay at the gNB-DU, and/or further determine or obtain the interface delay. The determination method can obtain or determine the feedback delay of the GTP-U packet at the gNB-DU according to the above-mentioned method 1 to method 21, and/or obtain or determine the interface delay of the GTP-U packet according to the above-mentioned method A to method F.

Figure 6:
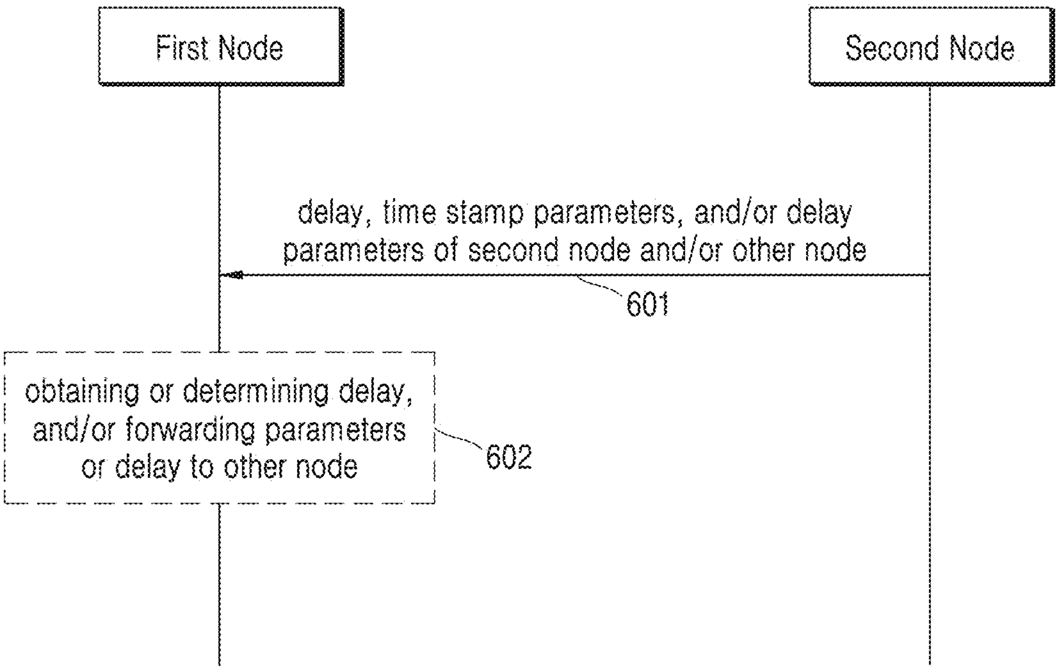
FIG. 6 illustrates a method supporting delay measurement according to an embodiment of the present disclosure.

FIG. 6 illustrates a method supporting delay measurement according to an embodiment of the present disclosure. Specifically, FIG. 6 illustrates a process of interaction of transceiving parameters related to a delay between nodes, for example, a second node can provide parameters related to a delay at the second node and/or parameters related to a delay at other nodes to the first node. In one implementation, for example, the first node may be a gNB-CU-UP and the second node may be a gNB-CU-CP; the first node may be a gNB-CU-UP, and the second node may be a gNB-DU; the first node may be a gNB-CU-CP, and the second node may be a gNB-DU; the first node may be a UPF, and the second node may be a gNB or gNB CU-UP or en-gNB or eNB or ng-eNB. However, the present disclosure is not limited to this, and the first node and the second node may be other nodes.

Step 601: The second node transmits a result of the delay and/or parameters of a timestamp at the second node and/or other nodes and/or parameters related to a feedback delay at the second node and/or other nodes to the first node. In one implementation, for example, the result of the delay, the parameters related to the timestamp and the parameters related to the feedback delay may be transmitted to the first node by the aforementioned seventh NR-U information frame or seventh message; in another implementation, for example, the result of the delay may be transmitted to the first node by the aforementioned fourth NR-U information or fourth message, the information of the parameters related to the timestamp may be transmitted to the first node by the aforementioned first NR-U information frame or first message, and the information of the parameters related to the feedback delay may be transmitted to the first node by the aforementioned second NR-U information frame or the second message or the third NR-U information frame or the third message.

Step 602: The first node can directly obtain the delay, and/or determine the feedback delay at the second node based on the received information of the parameters related to the timestamp at the second node and/or the parameters related to the feedback delay at the second node, and/or further determine or obtain the interface delay. In addition, the first node can forward the received parameters or the determined delay to other nodes. The determination method can obtain or determine the feedback delay of the GTP-U packet at the second node or other nodes according to the above-mentioned methods 1 to 21, and/or obtain or determine the interface delay of the GTP-U packet according to the above-mentioned methods A to F. After the first node obtains the interface delay, it may transmit the interface delay to other nodes as demand. For example, the first node can transmit via the aforementioned seventh NR-U information frame or seventh message.

Figure 7:
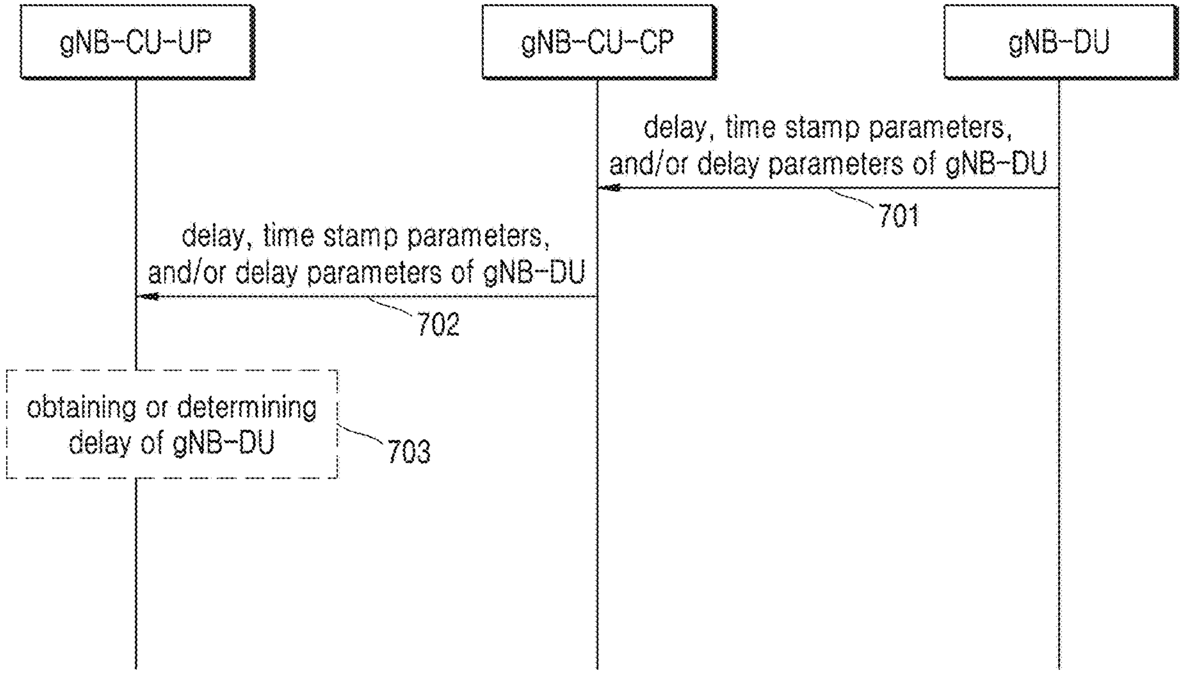
FIG. 7 illustrates a method supporting delay measurement according to an embodiment of the present disclosure.

FIG. 7 illustrates a method supporting delay measurement according to an embodiment of the present disclosure. Specifically, FIG. 7 illustrates a process where a gNB-CU-CP, a gNB-CU-UP and a gNB-DU interact parameters related to a delay, in order that the gNB-DU and the gNB-CU-CP can provide the gNB-CU-UP with the parameters related to the delay of the gNB-DU.

Step 701: The gNB-DU transmits a result of the delay and/or parameters related to a timestamp at the gNB-DU and/or parameters related to a feedback delay at the gNB-DU to the gNB-CU-CP. In one implementation, the result of the delay may be transmitted to the gNB-CU-CP by the aforementioned fourth message, the information of parameters related to the timestamp may be transmitted to the gNB-CU-CP by the aforementioned first message, and the information of parameters related to the feedback delay may be transmitted to gNB-CU-CP by the aforementioned second message or the third message.

Step 702: The gNB-CU-CP transmits the result of the delay and/or the parameters related to the timestamp and/or the parameters related to feedback delay of the gNB-DU to the gNB-CU-UP. In one implementation, the result of the delay may be transmitted to the gNB-CU-UP by the aforementioned seventh message.

Step 703: The gNB-CU-UP can directly obtain the delay, and/or determine or obtain the feedback delay at the gNB-DU based on the received information of the parameters related to the timestamp at the gNB-DU and/or the parameters related to the feedback delay at the gNB-DU, and/or further determine or obtain the interface delay. The determination method can obtain or determine the feedback delay of the GTP-U packet at the gNB-DU according to the above-mentioned method 1 to method 21, and/or obtain or determine the interface delay of the GTP-U packet according to the above-mentioned method A to method F.

Each of the methods described above in connection with FIGS. 3-7 may be implemented independently. Alternatively, a part of the steps of a method may be implemented separately. Or a part or all of a method may be combined with a part or all of any other one or more examples.

Figure 8:
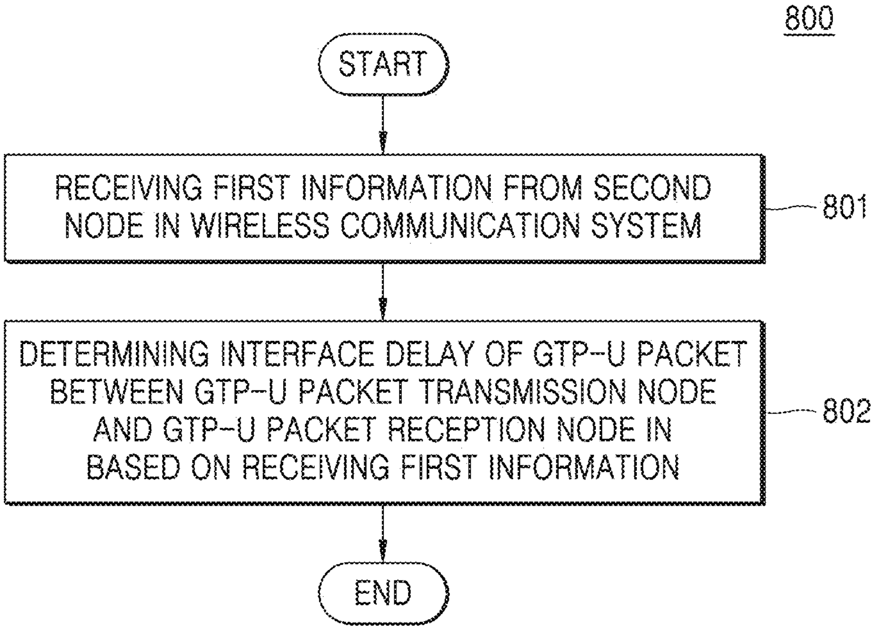
FIG. 8 illustrates a method performed by a first node in a wireless communication system according to an embodiment of the present disclosure.

FIG. 8 illustrates a method 800 performed by a first node 900 in a wireless communication system according to an embodiment of the present disclosure. The first node 900 can determine an interface delay between the first node 900 and a second node 1100 by this method.

Referring to FIG. 8, in step 801, the first node 900 receives first information from the second node 1100 in a wireless communication system. At step 802, the first node 900 determines an interface delay of a GTP-U packet between a GTP-U packet transmission node and a GTP-U packet reception node based on the first information. The first information may be the above-mentioned first NR-U information frame and/or the first message, and/or the second NR-U information frame and/or the second message, and/or the third NR-U information frame and/or the third message, and/or the fourth NR-U information frame and/or the fourth message, and/or the seventh NR-U information frame and/or the seventh message. The first node 900 can obtain or determine the feedback delay of the GTP-U packet at the second node 1100 according to the above-mentioned methods 1 to 21, and/or obtain or determine the interface delay of the GTP-U packet according to the above-mentioned methods A to F.

Figure 9:
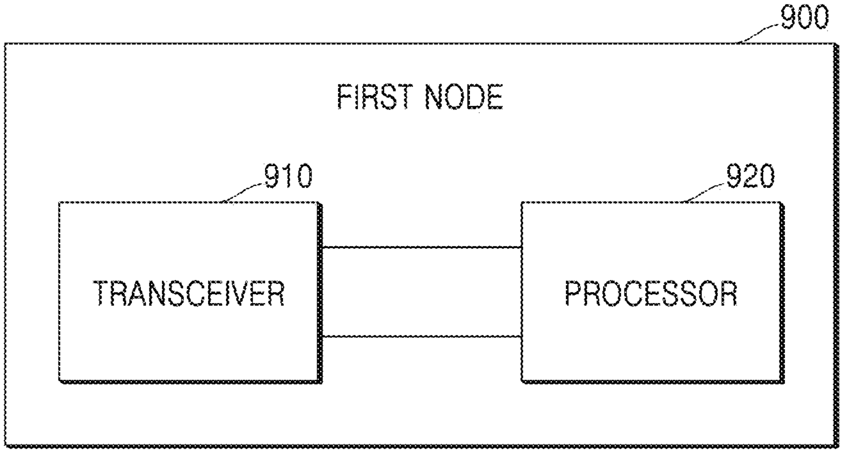
FIG. 9 illustrates a first node in a wireless communication system according to an embodiment of the present disclosure.

FIG. 9 illustrates the first node 900 in a wireless communication system according to an embodiment of the present disclosure. The first node 900 includes a transceiver 910 and a processor 920. The transmitter 910 may be configured to transmit signals to and/or receive signals from the outside. The processor 920 may be configured to control the transceiver 910 to: receive the first information from the second node 1100 in the wireless communication system; in response to receiving the first information, determine the interface delay of the GTP-U packet between the GTP-U packet transmission node and the GTP-U packet reception node. The first node 900 may be implemented in the form of hardware, software or a combination of hardware and software to enable it to perform any one or more steps of any method described in this disclosure. For example, the first node 900 may be a gNB-CU-UP, and the second node 1100 may be a gNB-DU; the first node 900 may be a gNB-CU-CP, and the second node 1100 may be a gNB-DU; the first node 900 may be a UPF, and the second node 1100 may be a gNB or gNB CU-UP or en-gNB or eNB or ng-eNB; the first node 900 may be a gNB-CU-UP, and the second node 1100 may be a gNB-CU-CP. However, the present disclosure is not limited to this, and the first node and the second node may be other nodes.

Figure 10:
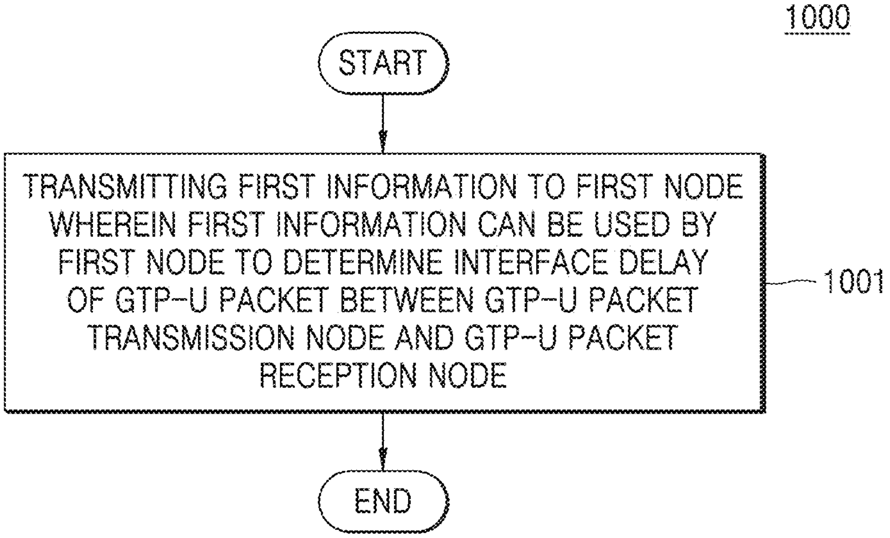
FIG. 10 illustrates a method performed by a second node in a wireless communication system according to an embodiment of the present disclosure.

FIG. 10 illustrates a method 1000 performed by the second node 1100 in a wireless communication system according to an embodiment of the present disclosure.

Referring to FIG. 10, in step 1001, the second node 1100 transmits the first information to the first node 900. The first information may be used by the first node 900 to determine the interface delay of the GTP-U packet between the GTP-U packet transmission node and the GTP-U packet reception node. The first information may be the first NR-U information frame and/or the first message, and/or the second NR-U information frame and/or the second message, and/or the third NR-U information frame and/or the third message, and/or the fourth NR-U information frame and/or the fourth message, and/or the seventh NR-U information frame and/or the seventh message. The first node 900 can obtain or determine the feedback delay of the GTP-U packet at the second node 1100 according to the above-mentioned methods 1 to 21, and/or obtain or determine the interface delay of the GTP-U packet according to the above-mentioned methods A to F.

Figure 11:
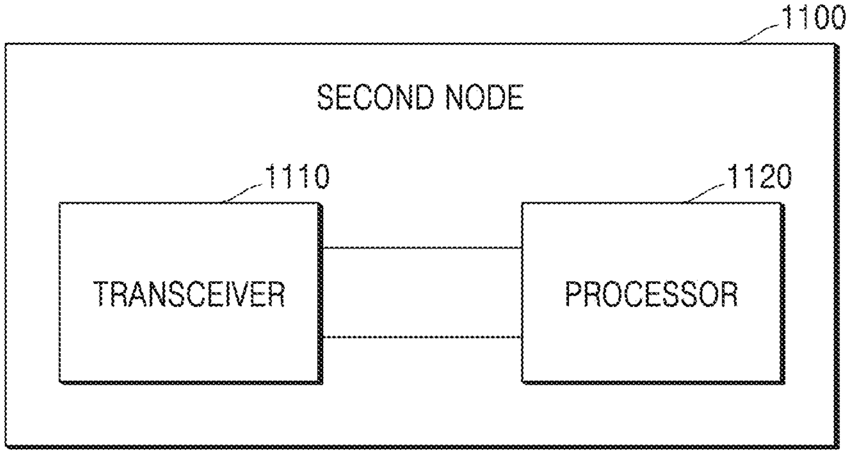
FIG. 11 illustrates a second node in a wireless communication system according to an embodiment of the present disclosure.

FIG. 11 illustrates the second node 1100 in a wireless communication system according to an embodiment of the present disclosure. The second node 1100 includes a transceiver 1110 and a processor 1120. The transmitter 1110 may be configured to transmit signals to and/or receive signals from the outside. The processor 1120 may be configured to control the transceiver 1110 to transmit the first information to the first node 900. The first information may be used by the first node 900 to determine the interface delay of the GTP-U packet between the GTP-U packet transmission node and the GTP-U packet reception node. The second node 1100 may be implemented in the form of hardware, software or a combination of hardware and software to enable it to perform any one or more steps of any method described in this disclosure. For example, the first node 900 may be a gNB-CU-UP, and the second node 1100 may be a gNB-DU; the first node 900 may be a gNB-CU-CP, and the second node 1100 may be a gNB-DU; the first node 900 may be a UPF, and the second node 1100 may be a gNB or gNB CU-UP or en-gNB or eNB or ng-eNB; the first node 900 may be a gNB-CU-UP, and the second node 1100 may be a gNB-CU-CP. However, the present disclosure is not limited to this, and the first node 900 and the second node 1100 may be other nodes.

The present disclosure provides a method performed by a first node in a wireless communication system, comprising: receiving first information from a second node in the wireless communication system; and in response to receiving the first information, determining an interface delay of a General Packet Radio Service Tunneling Protocol User Plane (GTP-U) packet between a GTP-U packet transmission node and a GTP-U packet reception node.

Optionally, the first information includes at least one of the followings: a reception time point of the GTP-U packet; a transmission time point of the first information at the GTP-U packet reception node; a reception time point of the first information at the GTP-U packet transmission node; a transmission time point of the GTP-U packet; a feedback delay of the GTP-U packet; a feedback delay of the GTP-U packet reception node; a feedback delay of a non-retransmitted packet at the GTP-U packet reception node; a GTP-U packet retransmission indication; a GTP-U packet radio link control (RLC) retransmission indication; a GTP-U packet hybrid automatic repeat request (HARQ) retransmission indication; a waiting time of GTP-U packet reception node; a waiting time of GTP-U packet; the number of RLC retransmissions of the GTP-U packet; the number of HARQ retransmissions of the GTP-U packet; the cumulative number of HARQ retransmissions of the GTP-U packet; a D1 delay; a D1 delay of the GTP-U packet; a D2 delay; a D2 delay of the GTP-U packet; a D3 delay; a D3 delay of the GTP-U packet; an inter-node interface delay; a measurement delay.

Optionally, the first node transmits second information to the second node, wherein the second information includes at least one of the followings: transmission time of the GTP-U packet; a delay feedback requirement.

Optionally, the delay feedback requirement includes at least one of the followings: a feedback delay report polling, a DU feedback delay report polling, a F1-U delay measurement report polling, a delay measurement report polling, a NR PDCP SN that needs to report delay parameters, a delay direction, a delay type, a delay parameter type, a feedback granularity, a result report type and a result report period.

Optionally, the first information is included in a new radio user plane protocol (NR-U) information frame or a message, and the second information is included in another new radio user plane protocol (NR-U) information frame or another message.

Optionally, the NR-U information frame includes at least one of the followings: an assistance information data information frame, a downlink data delivery status information frame, and a newly defined information frame; the other NR-U information frame includes at least one of the followings: an assistance information data information frame, a downlink data delivery status information frame, and a newly defined information frame; the message includes at least one of the followings: a F1 message, a NG message, a E1 message, a Xn message and a X2 message; and the other message includes at least one of the followings: a F1 message, a NG message, a E1 message, a Xn message and a X2 message.

Optionally, determining the interface delay of the GTP-U packet between the GTP-U packet transmission node and the GTP-U packet reception node comprises determining the feedback delay of the GTP-U packet at the GTP-U packet reception node based on the first information; and determining the interface delay based on a reception time point of the first information at the GTP-U packet transmission node, a transmission time point of the GTP-U packet and the feedback delay.

Optionally, determining the interface delay of the GTP-U packet between the GTP-U packet transmission node and the GTP-U packet reception node includes one of the followings: determining a difference between a reception time point of the first information at the GTP-U packet transmission node and a transmission time point of the first information at the GTP-U packet reception node as the interface delay; determining a difference between the reception time point of the GTP-U packet and the transmission time point of the GTP-U packet as the interface delay; determining the D3 delay as the interface delay; determining the D3 delay of the GTP-U packet as the interface delay; and determining the inter-node interface delay as the interface delay.

Optionally, the first node is the GTP-U packet transmission node and the second node is the GTP-U packet reception node.

Optionally, receiving the first information from the second node in the wireless communication system comprises: receiving the first information transmitted by the second node in response to the GTP-U packet, or receiving the first information transmitted by the second node in response to receiving the first information from the GTP-U packet reception node.

Optionally, the first node and the second node are configured as one of the followings: the first node is a gNB central unit user plane (gNB-CU-UP), and the second node is a gNB distributed unit (gNB-DU); the first node is a gNB central unit control plane (gNB-CU-CP), and the second node is a gNB-DU; the first node is a user plane function (UPF), and the second node is one of a next generation nodes B (gNB), a gNB CU-UP, an en-gNB, an evolved node B (eNB) and a ng-eNB; the first node is a gNB-CU-UP, and the second node is a gNB-CU-CP.

Optionally, the method further comprises transmitting the determined interface delay or the first information to a third node.

Optionally, in case that the first node is the gNB-CU-CP and the third node is the gNB-CU-UP, the first node transmits the determined interface delay or the first information to the third node through a gNB-CU-CP measurement result information message. According to another aspect of the present disclosure, there is provided a method performed by a second node in a wireless communication system, comprising: transmitting first information to a first node; and wherein, the first information is used by the first node to determine an interface delay of a General Packet Radio Service Tunneling Protocol User Plane (GTP-U) packet between a GTP-U packet transmission node and a GTP-U packet reception node.

Optionally, the first information includes at least one of the followings: a reception time point of the GTP-U packet; a transmission time point of the first information at the GTP-U packet reception node; a reception time point of the first information at the GTP-U packet transmission node; a transmission time point of the GTP-U packet; a feedback delay of the GTP-U packet; a feedback delay of the GTP-U packet reception node; a feedback delay of a non-retransmitted packet at the GTP-U packet reception node; a GTP-U packet retransmission indication; a GTP-U packet radio link control (RLC) retransmission indication; a GTP-U packet hybrid automatic repeat request (HARQ) retransmission indication; a waiting time of GTP-U packet reception node; a waiting time of GTP-U packet; the number of RLC retransmissions of the GTP-U packet; the number of HARQ retransmissions of the GTP-U packet; the cumulative number of HARQ retransmissions of the GTP-U packet; a D1 delay; a D1 delay of the GTP-U packet; a D2 delay; a D2 delay of the GTP-U packet; a D3 delay; a D3 delay of the GTP-U packet; an inter-node interface delay; a measurement delay.

Optionally, the first node transmits second information to the second node, wherein the second information includes at least one of the followings: transmission time of the GTP-U packet; a delay feedback requirement.

Optionally, the delay feedback requirement includes at least one of the followings: a feedback delay report polling, a DU feedback delay report polling, a F1-U delay measurement report polling, a delay measurement report polling, a NR PDCP SN that needs to report delay parameters, a delay direction, a delay type, a delay parameter type, a feedback granularity, a result report type and a result report period.

Optionally, the first information is included in a new radio user plane protocol (NR-U) information frame or a message, and the second information is included in another new radio user plane protocol (NR-U) information frame or another message.

Optionally, the NR-U information frame includes at least one of the followings: an assistance information data information frame, a downlink data delivery status information frame, and a newly defined information frame; the other NR-U information frame includes at least one of the followings: an assistance information data information frame, a downlink data delivery status information frame, and a newly defined information frame; the message includes at least one of the followings: a F1 message, a NG message, a E1 message, a Xn message and a X2 message; and the other message includes at least one of the followings: a F1 message, a NG message, a E1 message, a Xn message and a X2 message.

Optionally, the first information is used by the first node to determine the feedback delay of the GTP-U packet at the GTP-U packet reception node based on; and a reception time point of the first information at the GTP-U packet transmission node, a transmission time point of the GTP-U packet and the feedback delay is used by the first node to determine the interface delay based on.

Optionally, one of the followings is used by the first node to determine the interface delay: determining a difference between a reception time point of the first information at the GTP-U packet transmission node and a transmission time point of the first information at the GTP-U packet reception node as the interface delay; determining a difference between the reception time point of the GTP-U packet and the transmission time point of the GTP-U packet as the interface delay; determining the D3 delay as the interface delay; determining the D3 delay of the GTP-U packet as the interface delay; and determining the inter-node interface delay as the interface delay.

Optionally, the first node is the GTP-U packet transmission node and the second node is the GTP-U packet reception node.

Optionally, transmitting the first information to the first node comprises: transmitting the first information generated by the second node in response to the GTP-U packet, or transmitting the first information obtained by the second node in response to receiving the first information from the GTP-U packet reception node.

Optionally, the first node and the second node are configured as one of the followings: the first node is a gNB central unit user plane (gNB-CU-UP), and the second node is a gNB distributed unit (gNB-DU); the first node is a gNB central unit control plane (gNB-CU-CP), and the second node is a gNB-DU; the first node is a user plane function (UPF), and the second node is one of a next generation nodes B (gNB), a gNB CU-UP, an en-gNB, an evolved node B (eNB) and a ng-eNB; the first node is a gNB-CU-UP, and the second node is a gNB-CU-CP. According to another aspect of the present disclosure, there is provided a node in a wireless communication network, including a transceiver configured to transmit and receive signals; and a controller configured to control the transceiver to perform various methods of the present disclosure.

Various embodiments of the present disclosure can be implemented as computer-readable codes embodied on a computer-readable recording medium from a specific perspective. The computer-readable recording medium may be a volatile computer-readable recording medium or a non-volatile computer-readable recording medium. The computer-readable recording medium is any data storage device that can store data readable by a computer system. Examples of computer-readable recording media may include read-only memory (ROM), random access memory (RAM), compact disk read-only memory (CD-ROM), magnetic tape, floppy disk, optical data storage device, carrier wave (e.g., data transmission via the Internet), etc. Computer readable recording media can be distributed by computer systems connected via a network, and thus computer readable codes can be stored and executed in a distributed manner. Furthermore, functional programs, codes and code segments for implementing various embodiments of the present disclosure can be easily explained by those skilled in the field of application of the embodiments of the present disclosure.

It will be understood that the embodiments of the present disclosure can be implemented in the form of hardware, software or a combination of hardware and software. The software can be stored as program instructions or computer readable codes executable on a processor on a non-transitory computer readable medium. Examples of non-transitory computer-readable recording media include magnetic storage media (e.g., ROM, floppy disk, hard disk, etc.) and optical recording media (e.g., CD-ROM, digital video disk (DVD), etc.). Non-transitory computer-readable recording media can also be distributed on computer systems coupled by networks, so that computer-readable codes are stored and executed in a distributed manner. The medium can be read by a computer, stored in a memory, and executed by a processor. Various embodiments can be realized by a computer or a portable terminal including a controller and a memory, and the memory can be an example of a non-transitory computer-readable recording medium suitable for storing program(s) with instructions for implementing embodiments of the present disclosure. The present disclosure can be realized by a program with codes for concretely implementing the devices and methods described in the claims, which is stored in a machine (or computer) readable storage medium. The program can be electronically carried on any medium, such as a communication signal transmitted via a wired or wireless connection, and the present disclosure suitably includes its equivalents.

What has been described above is only the specific implementation of the present disclosure, but the scope of protection of the present disclosure is not limited to this. Anyone familiar with the technical field can make various changes or substitutions within the technical scope disclosed in the present disclosure, which should be covered by the claimed scope of the present disclosure. Therefore, the scope of this disclosure should be subject to the scope of the claims.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

The invention claimed is:

1. A method performed by a first node in a wireless communication system, comprising:

transmitting, by the first node, a user plane packet to a second node in the wireless communication system, wherein the user plane packet comprises a report polling indicator indicating a request for feedback information;

receiving, by the first node from the second node, the feedback information comprising a feedback delay time of a frame comprising the report polling indicator; and determining, by the first node, an interface delay of the user plane packet between the first node and the second node based on the feedback delay time.

2. The method of claim 1, wherein the interface delay is determined as (reception time of the feedback information at the first node−transmission time of the user plane packet at the first node−the feedback delay time)/2.

3. The method of claim 1, wherein the feedback delay time is measured from a reception time of the frame comprising the report polling indicator to a transmission time of the feedback information at the second node.

4. The method of claim 1, wherein the feedback information is included in downlink data delivery status information.

5. The method of claim 1, wherein the first node is a gNB central unit user plane (gNB-CU-UP), and the second node is a gNB distributed unit (gNB-DU).

6. A method performed by a second node in a wireless communication system, comprising:

receiving, by the second node, a user plane packet from a first node in the wireless communication system, wherein the user plane packet comprises a report polling indicator indicating a request for feedback information; and transmitting, by the second node to the first node, the feedback information comprising a feedback delay time of a frame comprising the report polling indicator, wherein an interface delay of the user plane packet between the first node and the second node is to be determined by the first node based on the feedback delay time.

7. The method of claim 6, wherein the interface delay is determined as (reception time of the feedback information at the first node−transmission time of the user plane packet at the first node−the feedback delay time)/2.

8. The method of claim 6, wherein the feedback delay time is measured from a reception time of the frame comprising the report polling indicator to a transmission time of the feedback information at the second node.

9. The method of claim 6, wherein the feedback information is included in downlink data delivery status information.

10. The method of claim 6, wherein the first node is a gNB central unit user plane (gNB-CU-UP), and the second node is a gNB distributed unit (gNB-DU).

11. A first node in a wireless communication system, comprising:

a transceiver; and at least one processor, coupled with the transceiver and configured to:

control the transceiver to transmit a user plane packet to a second node in the wireless communication system, wherein the user plane packet comprises a report polling indicator indicating a request for feedback information, control the transceiver to receive, from the second node, the feedback information comprising a feedback delay time of a frame comprising the report polling indicator, and determine an interface delay of the user plane packet between the first node and the second node based on the feedback delay time.

12. The first node of claim 11, wherein the interface delay is determined as (reception time of the feedback information at the first node−transmission time of the user plane packet at the first node−the feedback delay time)/2.

13. The first node of claim 11, wherein the feedback delay time is measured from a reception time of the frame comprising the report polling indicator to a transmission time of the feedback information at the second node.

14. The first node of claim 11, wherein the feedback information is included in downlink data delivery status information.

15. A second node in a wireless communication system, comprising:

a transceiver; and at least one processor, coupled with the transceiver and configured to:

control the transceiver to receive a user plane packet from a first node in the wireless communication system, wherein the user plane packet comprises a report polling indicator indicating a request for feedback information, and control the transceiver to transmit, to the first node, the feedback information comprising a feedback delay time of a frame comprising the report polling indicator, wherein an interface delay of the user plane packet between the first node and the second node is to be determined by the first node based on the feedback delay time.

16. The second node of claim 15, wherein the interface delay is determined as (reception time of the feedback information at the first node−transmission time of the user plane packet at the first node−the feedback delay time)/2.

17. The second node of claim 15, wherein the feedback delay time is measured from a reception time of the frame comprising the report polling indicator to a transmission time of the feedback information at the second node.

18. The second node of claim 15, wherein the feedback information is included in downlink data delivery status information.

* * * * *